INVENTORS
SAMUEL LUBKIN
EDMUND D. SCHREINER
BY S.C. Yuter
ATTORNEY

GATE 82

BUFFER 104

DELAY LINE 126

AMPLITUDE DISCRIMINATOR 140

INVENTORS.
SAMUEL LUBKIN
EDMUND D. SCHREINER
BY S.C. Yuter
ATTORNEY

TAPE READING AMPLIFIER 198

INVENTORS.
SAMUEL LUBKIN
EDMUND D. SCHREINER
BY S.C. Yuter
ATTORNEY

DELAY FLOP 336

COUNTER STAGE 358

INVENTORS.
SAMUEL LUBKIN
EDMUND D. SCHREINER
BY S.C. Yuter
ATTORNEY

INVENTORS.
SAMUEL LUBKIN
EDMUND D. SCHREINER
BY S.C. Yuter
ATTORNEY

INVENTORS.
SAMUEL LUBKIN
EDMUND D. SCHREINER
BY S.C. Yuter
ATTORNEY

Sept. 30, 1958 S. LUBKIN ET AL 2,854,624

MAGNETIC TAPE PROCESSOR

Filed July 23, 1953 7 Sheets-Sheet 7

United States Patent Office 2,854,624 Patented Sept. 30, 1958

2,854,624

MAGNETIC TAPE PROCESSOR

Samuel Lubkin, Brooklyn, and Edmund D. Schreiner, Port Washington, N. Y., assignors to Underwood Corporation, New York, N. Y., a corporation of Delaware Application July 23, 1953, Serial No. 369,878

11 Claims. (Cl. 324—34)

This invention relates to the processing of a magnetic recording medium so that it may be suitable for use as a storage device for a data processor such as an electronic digital computer. More particularly, it relates to a method of and apparatus for processing a magnetic recording tape.

Magnetic recording tape has heretofore been used with electronic digital computers as a storage medium for numerical information recorded thereon in the form of magnetized spots. Such information may be recorded on the tape using the binary system of notation wherein the binary digits "1" and "0" may be expressed by the presence or absence of a particular condition; for example, the presence or absence of a given magnetic state on a unit area of the magnetic recording tape.

Unfortunately, the quality of the presently available magnetic recording tape is poor mainly due to non-uniformity of the magnetic coating of the tape. Therefore, signals recorded in areas of the tape which have unacceptable magnetic properties will result, during playback, in the production of playback signals having magnitudes which are unusable.

Magnetic recording tape has been processed heretofore to remove areas having unacceptable magnetic properties by magnetically examining the tape and physically deleting the imperfect portions while splicing together the acceptable portions. However, this process is slow and tedious and therefore expensive. Further, the splices may result in improper operation of the computer due to the generation of unwanted signals at the spliced junctions.

Magnetic recording tape has also been used without processing by simultaneously recording the same data in two or more channels of the tape, since the occurrence of defective areas in all positions carrying the same data is very remote. However, half or more of the available storage area is thus wasted.

The defective areas of a magnetic recording tape have also been detected heretofore, without removing segments of the magnetic tape, by magnetically examining the tape and punching a hole in an area preceding an imperfection and in an area succeeding the imperfection such that the computer will be disabled while the tape area between the two holes passes the sensing device. However, this process is also wasteful as the holes may be punched in areas of the tape which have acceptable magnetic properties.

Accordingly, it is an object of the present invention to rapidly and inexpensively process a magnetic recording tape so that it will have a high degree of reproduction accuracy.

Another object of the invention is to provide a method of and apparatus for processing a magnetic recording tape to thereby minimize the difficulties caused by the presence of defective areas on a magnetic recording tape.

A further object of the invention is the provision of apparatus for examining every discrete area of a magnetic recording tape for acceptable magnetic properties which may be used for storage purposes during computer operations.

A still further object is to provide a method of processing a magnetic recording tape including the recording of a signal in the discrete areas of the magnetic recording tape corresponding to sections of the tape which have acceptable magnetic properties.

In accordance with the invention, the processor includes examining and recording means for examining discrete areas of the magnetic recording tape for acceptable magnetic properties and recording a signal in areas of the tape corresponding to the discrete areas of the tape which have acceptable magnetic properties.

A feature of the present invention is the provision of means for individually or simultaneously examining a multi-channel magnetic recording tape.

Other objects, features and advantages of the invention will be best understood from the following description and claims and are illustrated in the accompanying drawings wherein:

Figures 2, 3, 4 and 5 illustrate schematic equivalents of the components of the apparatus shown in block symbol form in Figures 1 and 6 wherein:

Figure 2A:
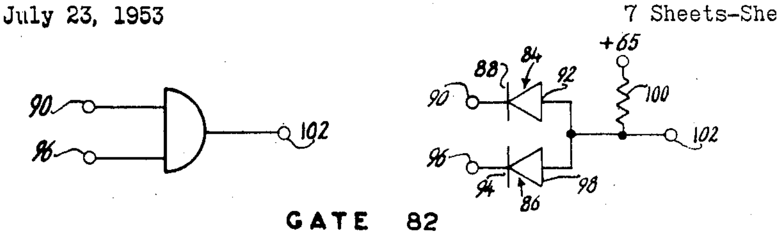

Figure 2*a* shows a typical coincidence ("and") gate circuit.

Figure 2B:
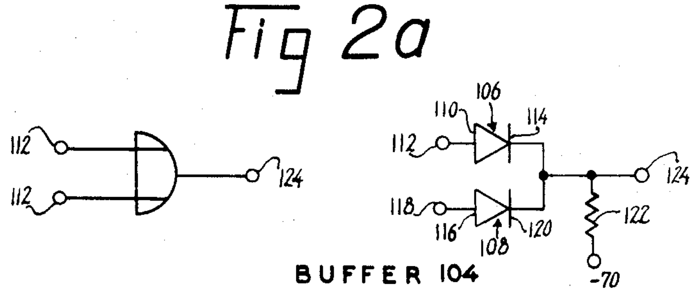

Figure 2*b* illustrates the circuit of a representative buffer ("or" gate).

Figure 2C:
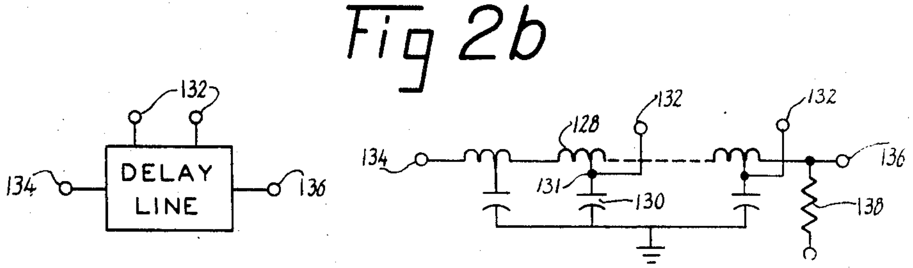

Figure 2*c* shows diagrammatically a typical delay line.

Figure 2D:
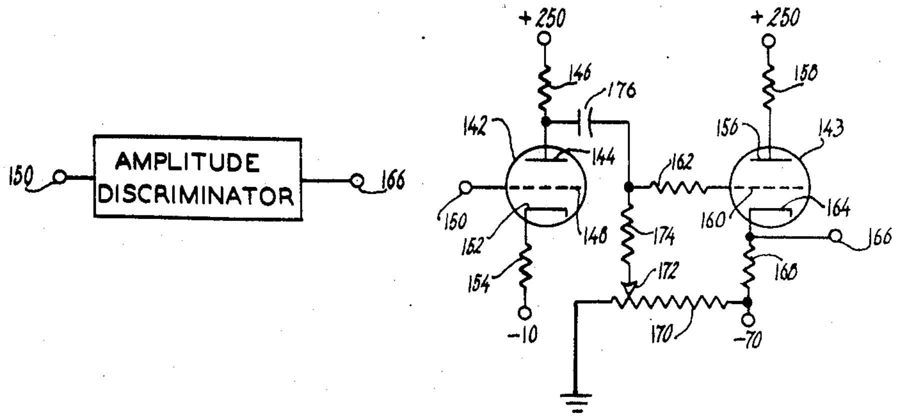

Figure 2*d* shows schematically the circuit of a representative amplitude discriminator.

Figure 3A:
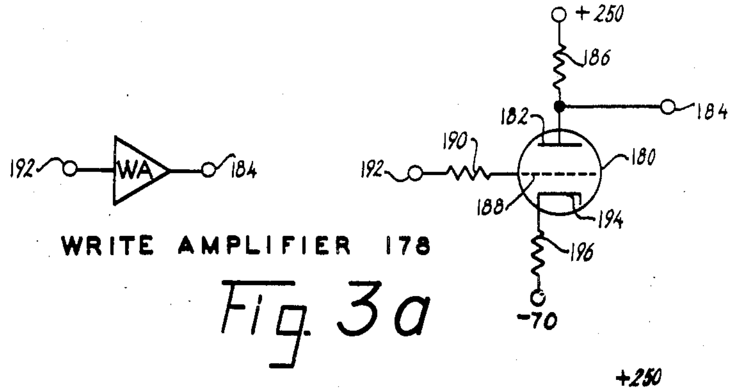

Figure 3*a* schematically illustrates a representative write amplifier.

Figure 3B:
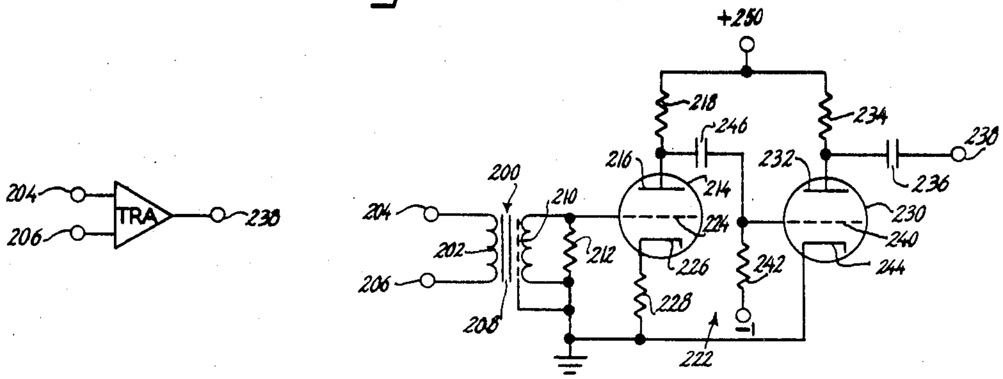

Figure 3*b* is a schematic diagram of a typical tape reading amplifier.

Figure 3C:
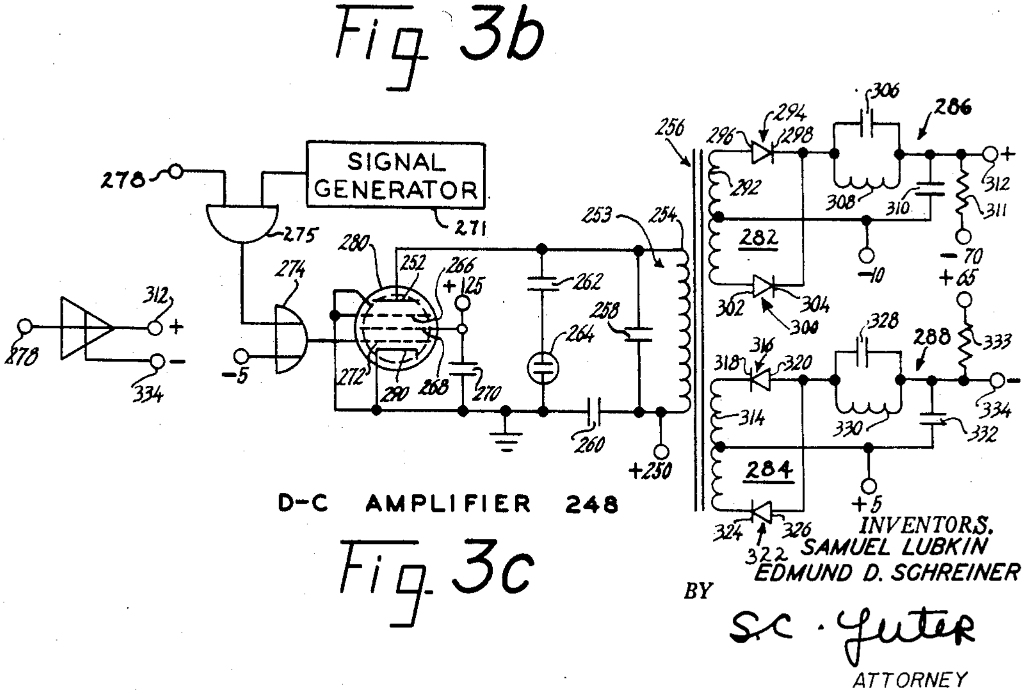

Figure 3*c* schematically illustrates a representative direct current (D.-C.) amplifier.

Figure 4A:
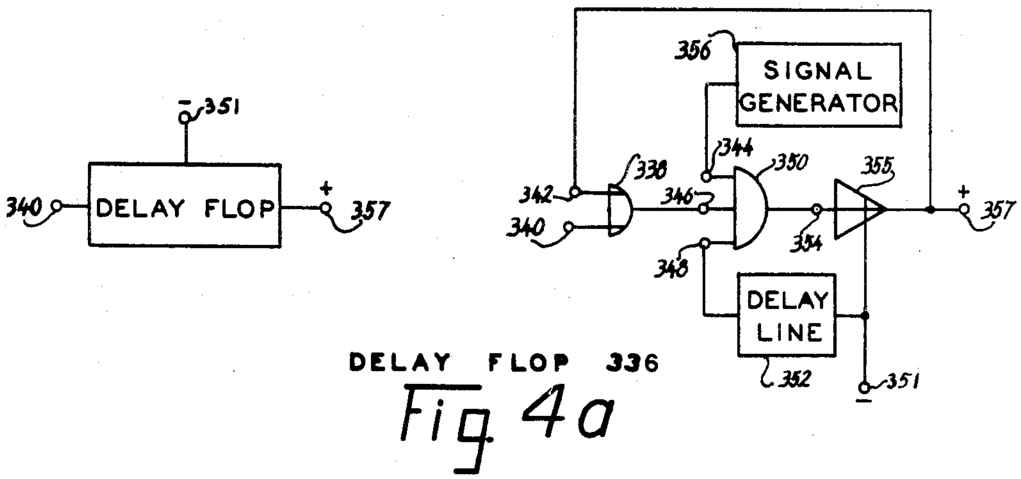

Figure 4*a* schematically illustrates a delay flip-flop.

Figure 4B:
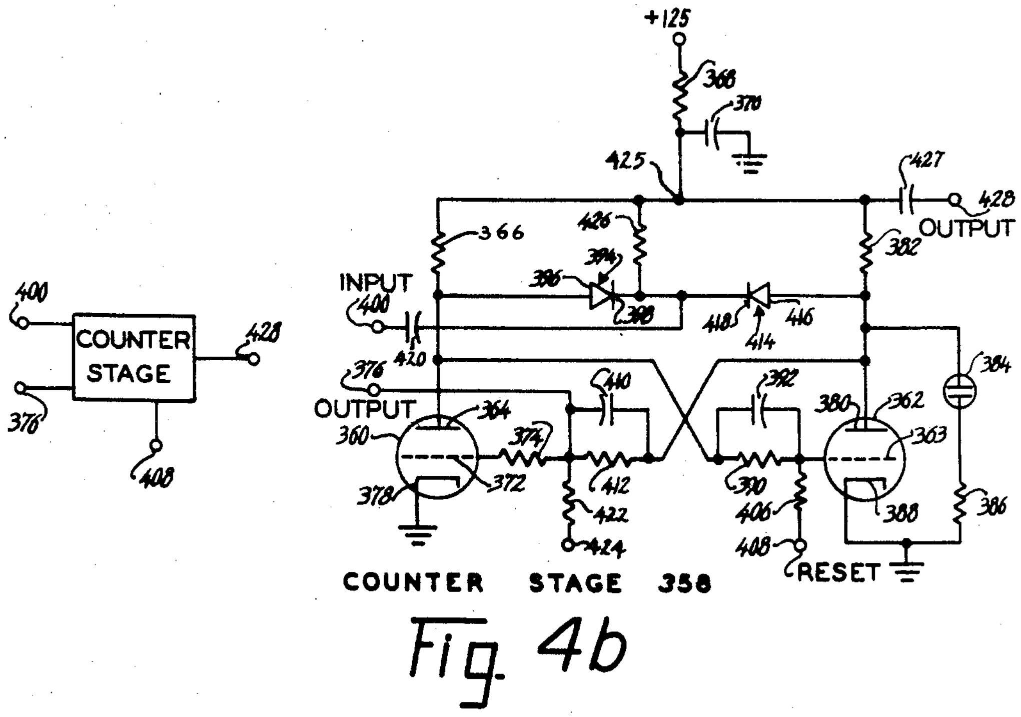

Figure 4*b* schematically illustrates a typical counter stage.

Figure 5:
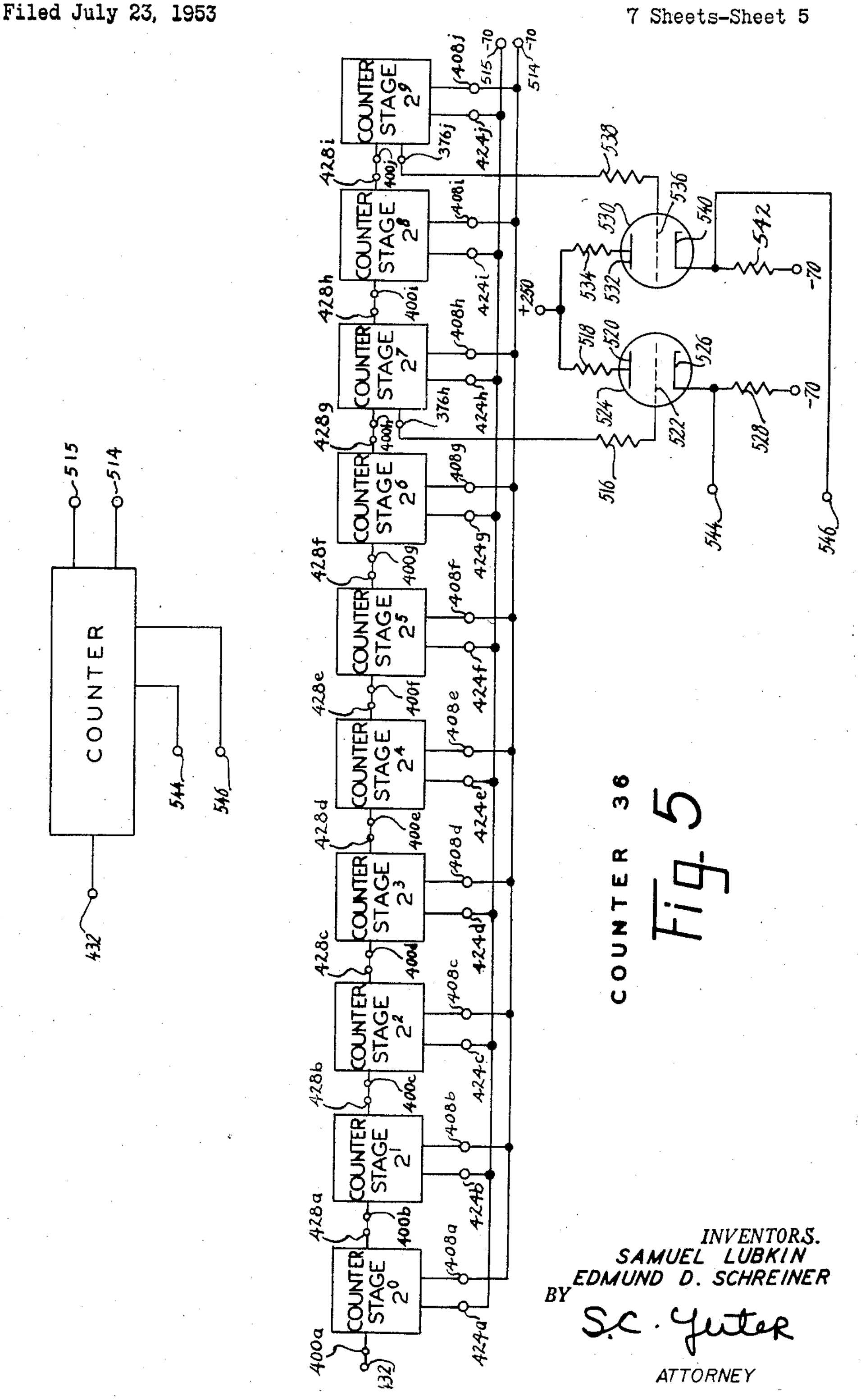

Figure 5 is a block diagram of a pulse counter.

Figure 1:
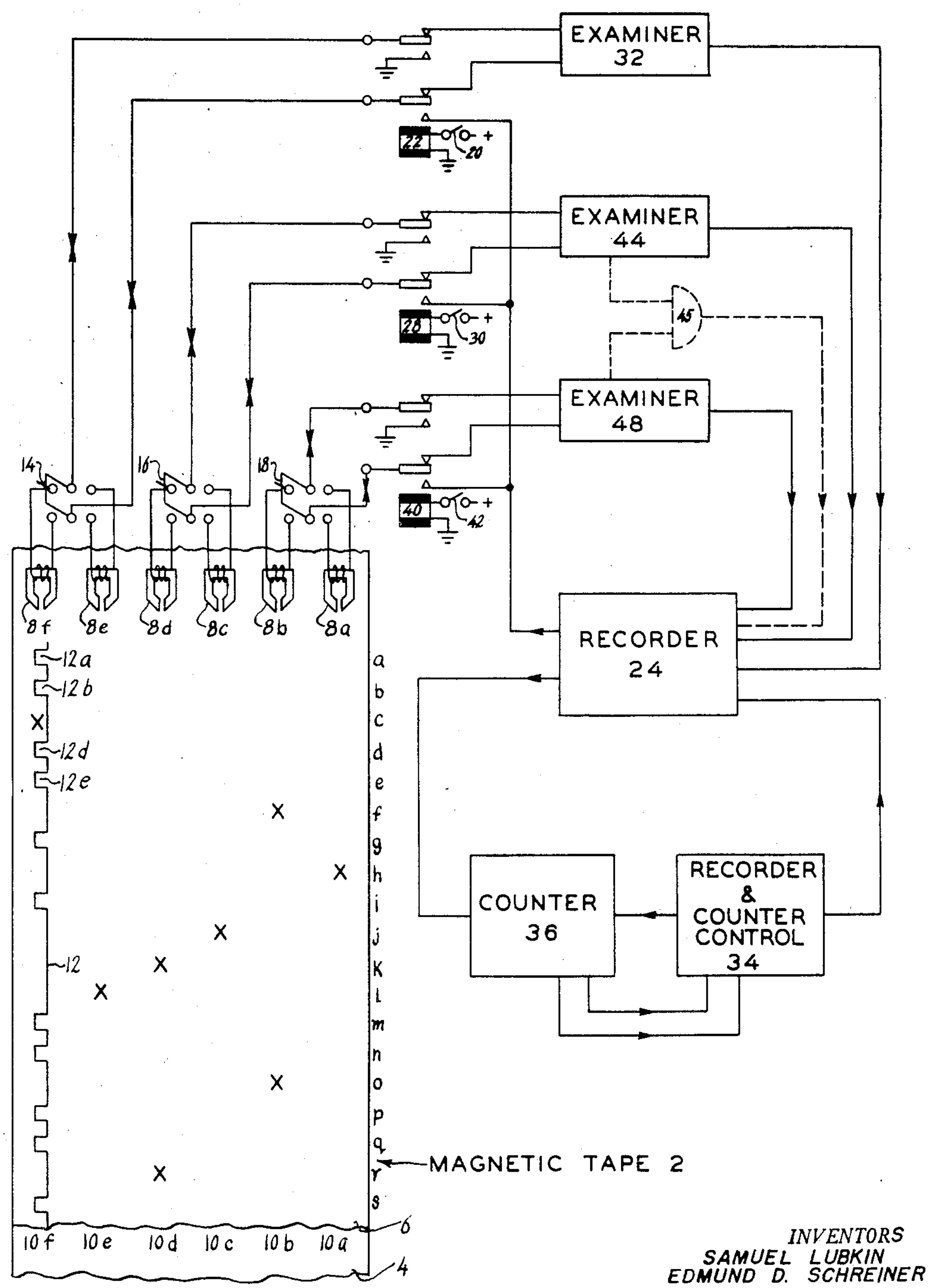
Figure 1 shows a fragmentary view of the magnetic tape being processed (with the magnetic impressions of the signals pictorially illustrated) and includes a schematic block diagram of the apparatus for processing the non-sprocketed tape.
Figure 6:
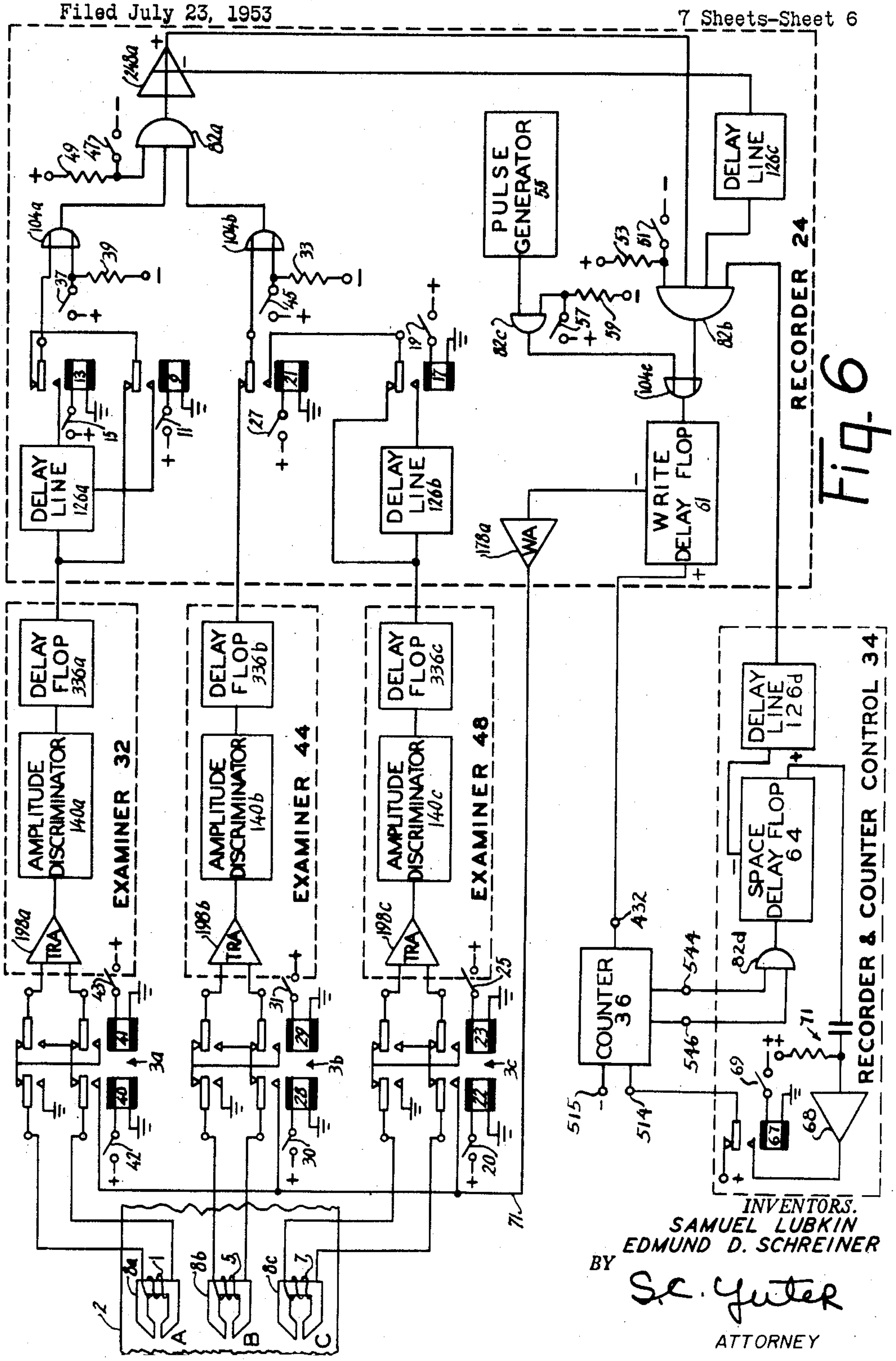

Figure 6 illustrates a detailed block diagram of the apparatus shown in Figure 1 which is employed to process the magnetic tape.

Figure 7:
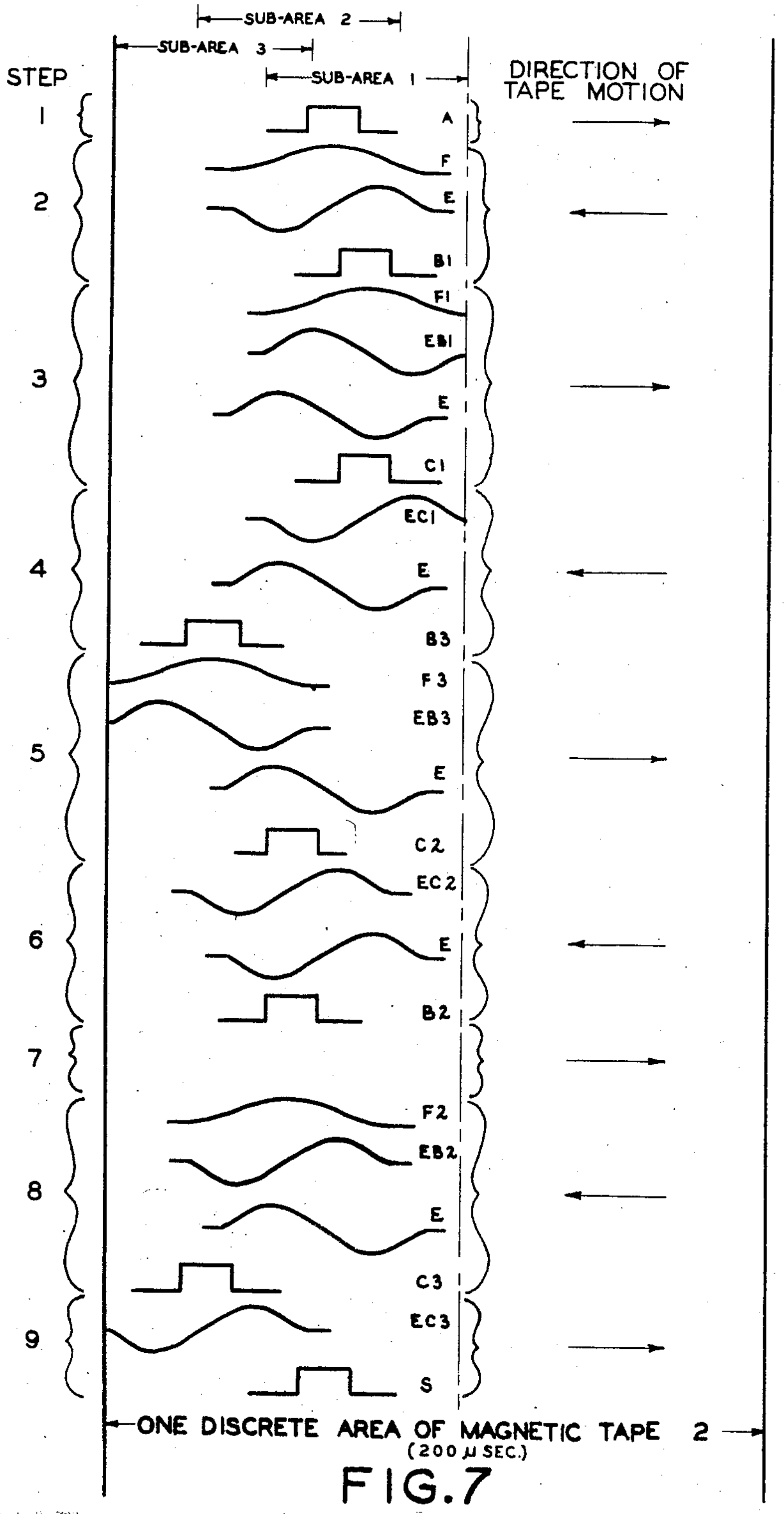

Figure 7 is a table of wave shapes for various signals which occur during the operation of the apparatus shown in Figure 6.

*Introduction*

Referring more particularly to the tape processing apparatus shown in Figure 1, the magnetic tape 2 comprises a flexible nonmagnetic body 4 and a coating or surface 6. The body 4 may be made of any nonmagnetic material having the requisite tensile strength such as paper, or a plastic, or a synthetic resin, or a nonmagnetizable metal. The surface 6 is a very thin layer containing a substantially uniform distribution of permanently magnetizable material; for example, red iron oxide. The thickness of the surface 6 is in the order of .0005 inch.

The magnetic tape 2 is supported by a tape reeling mechanism (not shown) which moves the tape past the reading-recording heads 8. Each reading-recording head 8 sweeps one of a plurality of parallel channels 10 which are longitudinally positioned along the tape 2. Six channels (channels 10*a*–10*f*) are shown in Fig. 1. However, any number of channels or only one channel may be employed as will be explained hereinafter.

The magnetic tape 2 is processed by first examining the discrete areas of one channel for acceptable magnetic properties. Then the discrete areas of the other channels adjacent to the discrete areas of the first channel are examined for acceptable magnetic properties. Finally, a sprocket pulse signal train 12 is recorded on the magnetic tape 2 in the discrete areas of one channel which are adjacent to the discrete areas of the last examined channel having acceptable magnetic properties. The size of the discrete areas are preferably chosen so that a single pulse can be readily recorded therein when the magnetic tape 2 is used in conjunction with a computer.

For convenience of description, the magnetic tape 2 is divided into transverse sections *a, b, c* and so on. The transverse sections extend across the magnetic tape 2 perpendicular to the channels 10 and include a single discrete area in each channel. In addition, each discrete area of the magnetic tape 2 capable of storing a unit of information is designated by a position reference character corresponding to a channel number and a transverse section letter. For example, a discrete area of the magnetic tape 2 which has unacceptable magnetic properties (hereinafter designated by an "*x*") is located at position 10*a–h*. The channel containing the sprocket pulse signal train 12 will hereinafter be termed the sprocket channel 10*f*. The sprocket pulse signal train 12 comprises the sprocket pulse signals 12*a*, 12*b*, 12*d*, 12*e*, and so on.

Therefore, a sprocket pulse signal will be recorded in a discrete area of the magnetic tape 2 which is included in a transverse section of adjacent discrete areas of the channels 10 which has acceptable magnetic properties. If one discrete area in a section has a defect, no sprocket pulse signal will be recorded in the corresponding discrete area of the sprocket channel 10*f*. After the sprocket pulse signal train 12 is recorded, all other signals in the remaining channels 10*a*–10*e* are erased.

The channels 10 may be examined in any order. For example, the channels 10 may be examined in the following sequence: channel 10*a*, channel 10*c*, channel 10*e*, channel 10*b*, channel 10*d* and channel 10*f*. Another sequence of examination would be channel 10*a*, channel 10*d*, channel 10*f*, channel 10*b*, channel 10*e* and channel 10*c*. It is preferable that the sequence be chosen so that reading and recording is not performed simultaneously in adjacent channels so that difficulties of the "crosstalk" problem may be avoided. However, if proper precautions are taken, such as spacing the magnetic heads properly or shielding the magnetic heads from each other, so as to minimize the "crosstalk" problem, the reading and recording operation may be performed in adjacent channels. Further, if these precautions are taken all of the information channels may be examined simultaneously. Of course, the magnetic tape 2 is not limited to a particular number of channels 10, and any channel 10 may be utilized to store the sprocket pulse signal train 12. Further, in the case of a magnetic tape 2 carrying only one channel, the sprocket pulse signal train may be recorded in discrete areas of the channel which are adjacent to or which correspond to the discrete areas of the channel which have acceptable magnetic properties, as for example by recording in alternate discrete areas of the channel.

*General description of the method and apparatus for processing a magnetic tape*

One type of apparatus suitable for processing the magnetic tape 2 is illustrated particularly in Fig. 1. The channels 10 are examined in the following sequence: Channel 10*f*, 10*d*, 10*b*, 10*e*, 10*c* and 10*a*. Double-pole double throw switches 14, 16 and 18 are fixed in the left hand position to place reading-recording heads 8*f*, 8*d* and 8*b*, respectively, in operation. Relay switch 20 is closed to connect relay 22 between a positive supply bus and ground. A first pulse signal train is generated by recorder 24 and is fed by means of the lower contact arm of the energized relay 22 to one terminal of the reading-recording head 8*f*. The upper contact arm of relay 22 grounds the other terminal of the reading-recording head 8*f* to complete the recording circuit. The first pulse signal train is recorded in channel 10*f* as the magnetic tape 2 moves past the reading-recording head 8*f*.

After the first pulse signal train is recorded in channel 10*f*, relay 22 is de-energized by opening relay switch 20 and relay 28 is energized by closing relay switch 30. The reading-recording head 8*f* is then coupled to the examiner 32 by means of the contact arms of relay 22.

The examiner 32 functions to generate and transmit a pulse signal to recorder 24 for each discrete area of channel 10*f* examined which has magnetic properties equal to or greater than a given standard as indicated by the amplitude of the playback signal generated in the reading-recording head 8*f* as the first pulse signal train is played back.

The recorder 24 is connected to one terminal of reading-recording head 8*d* by means of the lower contact arm of energized relay 28. The upper contact arm of relay 28 connects the other terminal of the reading-recording head 8*d* to ground to complete the recording circuit.

If the magnetic properties of each discrete area being examined meet the minimum requirements as reflected by the amplitude of the playback signal, the examiner 32 generates and transmits via the recorder 24 a pulse signal which is recorded in a corresponding position in channel 10*d*. Therefore, a second pulse signal train similar to the first pulse signal train will be recorded in channel 10*d*. For example, if the passage of position 10*f–a* by the magnetic head 8*f* produces a signal of acceptable amplitude, a pulse having a shape similar to the shape of the previous recording signal will be recorded in position 10*d–a*. If the discrete area of a particular position has poor magnetic properties such as position 10*f–c*, then a pulse signal will not be recorded in the corresponding position 10*d–c*.

This examination procedure is repeated with respect to the signals recorded in channel 10*d*, and a third pulse signal train is recorded in channel 10*b*. In other words, if the discrete area of a particular position in channel 10*d* has acceptable magnetic properties, then a corresponding signal will be recorded in channel 10*b*. During this operation double-pole double throw switch 14 is opened to prevent the pulse signal train previously recorded in channel 10*f* from being read by reading-recording head 8*f* and transmitted to recorder 24. Relay 28 is de-energized by opening relay switch 30 and relay 40 is energized by closing relay switch 42. The reading-recording head 8*d* is coupled to the examiner 44 via the contact arms of relay 28. The examiner 44 functions to generate and transmit a pulse signal to recorder 24 for each discrete area of channel 10*d* examined which has magnetic properties equal to or greater than a given standard as indicated by the amplitude of the playback signal generated in the magnetic head 8*d* as the second pulse signal train is played back.

The recorder 24 is connected to one terminal of the reading-recording head 8*b* by means of the lower contact arm of energized relay 40. The upper contact arm of relay 40 connects the other terminal of the magnetic head 8*b* to ground to complete the recording circuit.

If the magnetic properties of each discrete area being examined meet the minimum requirements as reflected by the amplitude of the playback signal, the examiner 44 generates and transmits via recorder 24 a pulse signal which is recorded in a corresponding position in channel 10*b*. Therefore, a third pulse signal train similar to the second pulse signal train will be recorded in channel 10*b*. For example, if the passage of position 10*d–a* by the magnetic head 8*d* produces a signal of acceptable amplitude, a pulse having a shape similar to the shape of the previous recording pulse signal will be recorded in position 10*b*–*a*. If the discrete area of a particular position has poor magnetic properties then a pulse signal will not be recorded in the corresponding position in channel **10*b***.

The examination procedure is again repeated with respect to the signals recorded in channel **10*b* and a fourth pulse signal train is recorded in channel 10*e*. In other words, if the discrete area of a particular position in channel 10*b* has acceptable magnetic properties, then a corresponding pulse signal will be recorded in channel 10*e*. During this operation double-pole double throw switch 16 is opened to prevent the pulse signal train previously recorded in channel 10*d* from being read by reading-recording head 8*d* and transmitted to recorder 24. Further, double-pole double throw switch 14 is fixed in the right hand position to connect reading-recording head 8*e* in a recording circuit, relay 40 is de-energized by opening switch 42 and relay 22 is energized by closing switch 20. The reading-recording head 8*b* is coupled to the examiner 48 via the contact arms of relay 40 and the output of examiner 48 is applied to the input of recorder 24**.

The examiner 48 functions to generate and transmit a pulse signal to recorder 24 for each discrete area of channel **10*b* examined which has magnetic properties equal to or greater than a given standard as indicated by the amplitude of the playback signal generated in the reading-recording head 8*b*** as the third pulse signal train is played back.

The recorder 24 is connected to one terminal of the reading-recording head **8*e* by means of the lower contact arm of energized relay 22. The upper contact arm of relay 22 connects the other terminal of the reading-recording head 8*e*** to ground to complete the recording circuit.

If the magnetic properties of the discrete area being examined meet the minimum requirements as reflected by the amplitude of the playback signal, the examiner 48 generates and transmits via recorder 24 a pulse signal which is recorded in channel **10*e*. Therefore, a fourth pulse signal train similar to the third pulse signal train will be recorded in corresponding positions in channel 10*e*. For example, if the passage of position 10*b*–*a* by the reading-recording head 8*b* produces a signal of acceptable amplitude, a pulse having a shape similar to the shape of the previous recording pulse signal will be recorded in position 10*e*–*a*. If the discrete area of a particular position has poor magnetic properties then a pulse signal will not be recorded in the corresponding position in channel 10*e***.

Thus a pulse signal will be recorded in channel **10*e* in every position which corresponds to the adjacent positions in channels 10*f*, 10*d* and 10*b***, which have acceptable magnetic properties.

Double-pole double throw switches 16 and 18 are then placed in the appropriate positions and a procedure similar to that for examining channels **10*f*, 10*d* and 10*b*, is followed to examine channels 10*e*, 10*c* and 10*a*. That is, channel 10*e* is examined and the pulse signals of acceptable amplitude are transferred to corresponding positions in channel 10*c*; channel 10*c* is examined and the pulse signals of acceptable amplitude are transferred to corresponding positions in channel 10*a***.

Thus a pulse signal will be recorded in channel **10*a* in every position which corresponds to the adjacent positions in channels 10*e* and 10*c***, which have acceptable magnetic properties.

When the six channels have been processed the final operation is to transfer the pulse signal train in channel **10*a* to channel 10*f*, called sprocket channel 10*f*, in spaced blocks of sprocket pulse signals. The completely sprocketed magnetic tape is preferably chosen to consist of blocks of sprocket pulse signals, each block comprising 640 sprocket pulse signals, corresponding to blocks of information to be recorded on the magnetic tape 2**. It should be noted, however, that the blocks of sprocket pulse signals are not necessarily limited to 640 sprocket pulse signals but may consist of any number of sprocket pulse signals.

The recorder and counter control 34 in its normal state functions during the processing of the magnetic tape to condition recorder 24 and decondition counter 36. During the final step of processing the magnetic tape, the recorder and counter control 34 will condition counter 36 to respond to the sprocket pulse signals that are being recorded in the sprocket channel **10*f*. The counter 36 will count a total of 640 sprocket pulse signals and will then cause recorder and counter control 34 to reset counter 36 and decondition recorder 24 for a period of forty milliseconds, which is the interval between blocks so that it will not be responsive to sprocket pulse signals for that period of time. After this period the recorder and counter control 34 returns to its normal state and conditions both the recorder 24 and counter 36 to be responsive to the next 640** sprocket pulse signals. This procedure will be repeated so that the completely sprocketed magnetic tape will consist of spaced blocks of 640 sprocket pulse signals corresponding to blocks of information pulse signals.

Double-pole double throw switch 14 is fixed in the left hand position, double-pole double throw switch 18 is fixed in the right hand position, double-pole double throw switch 16 is opened to prevent the pulse signal trains previously recorded in channels **10*d* and 10*c* from being read by reading-recording heads 8*d* and 8*c* respectively and transmitted to recorder 24, relay 40 is de-energized by opening relay switch 42, relay 22 is energized by closing relay switch 20 and recorder and counter control 34 operates to condition counter 36 to be responsive to the final pulse signal train being transferred from channel 10*a* to the sprocket channel 10*f***.

Thus, a sprocket pulse signal will be recorded in each position of the sprocket channel **10*f* which corresponds to the adjacent positions in channels 10*f*, 10*e*, 10*d*, 10*c*, 10*b* and 10*a* which have acceptable magnetic properties. The sprocket pulse signal train 12 is pictorially illustrated in idealized pulse form to represent the flux patterns of the magnetic impressions on the surface 6 of the magnetic tape 2 since the flux patterns are not visually discernible. Further, it should be noted that the various recording pulse signal trains need not be necessarily limited to square wave shape nor need the interval between pulse signals be necessarily equal. This sprocket pulse signal is retained in the sprocket channel 10*f* while all signals present in the remaining channels 10*a* to 10*e* are erased. Magnetic tape 2 is then ready to be utilized as a magnetic storage device in an electronic digital computer which will only store information items in positions on the magnetic tape 2** adjacent to the sprocket positions.

It should be noted that the playback signals are roughly the derivative of the recording pulse signals, so that only a portion of each discrete area in a channel is examined during a single reading operation. To place the process in the direction of safety, such that pulse signals representing information may be recorded in the examined portion of each discrete area in a channel, the magnetic properties of a central region and two end regions of each of the discrete areas of each channel are examined (see Fig. 9). The detailed method and apparatus for processing such as magnetic tape will be explained hereinafter.

Another method of processing the magnetic tape 2 is to treat two or more channels logically as one channel. More specifically, in the case of two channels the output of examiners 44 and 48 is applied to gate 45 such that a recording in channel **10*e*, for example, is conditioned upon both signals recorded in channels 10*c* and 10*b* reaching the acceptance level. Therefore, the channels 10 may be examined in the following sequence: channel 10*f*, channels 10*c* and 10*b*, channel 10*e*, channels 10*d*** and 10*a*. This is, channel 10*f* is examined and the pulse signals of acceptable amplitude are transferred to corresponding positions in channels 10*c* and 10*b*, channels 10*c* and 10*b* are simultaneously examined and the pulse signals of acceptable amplitude are transferred via gate 45 as a single pulse train to corresponding positions in channel 10*e*, channel 10*e* is examined and the pulse signals of acceptable amplitude are transferred to corresponding positions in channels 10*d* and 10*a*, channels 10*d* and 10*a* are simultaneously examined and the pulse signals of acceptable amplitude are transferred via gate 45 as a single pulse train to corresponding positions in the sprocket channel 10*f*. Therefore, a sprocket pulse signal train will again be recorded in sprocket channel 10*f* in every position which corresponds to the adjacent positions in channels 10*f*, 10*e*, 10*d*, 10*c*, 10*b* and 10*a* which have acceptable magnetic properties. Likewise, in a similar manner any number of channels may be simultaneously examined.

*Description of symbols*

Figs. 2, 3, 4 and 5 illustrate the table of symbols which will be employed to simplify the detailed explanation of the invention.

For convenient reference, all positive and negative voltage supply buses will hereinafter be identified with a number corresponding with their voltage.

A principal feature of an electronic digital computer is the ability to switch signals rapidly from one component of the computer to another. Electronic gates of the concidence type are frequently used as switches to govern the passage one one signal by the presence of one or more other signals which control the operation of the gate.

Fig. 2*a* shows the symbol which represents the coincidence or "and" gate 82. The gate 82 has the property of producing an output signal corresponding to the signal having the lowest potential being applied to any of its inputs.

The gate 82 comprises a plurality of crystal diodes 84 and 86 which are preferably of the germanium crystal diode type, although any unilateral conducting device will suffice. The crystal diode 84 comprises a cathode 88 connected to the input terminal 90 and an anode 92. The crystal diode 86 comprises a cathode 94 connected to the input terminal 96 and an anode 98. The anodes 92 and 98 are interconnected and coupled to the positive supply bus 65 via resistor 100. The interconnected anodes are also connected to the output terminal 102 of the gate 82.

If no signal is present at either input terminal 90 or 96 the cathodes 88 and 94 will normally be maintained at a negative potential of ten volts by circuits (not shown) connected to the input terminals 90 and 96, while the anodes 92 and 98 are initially at a positive potential approximating 65 volts. Inasmuch as the anodes 92 and 98 are initially at a more positive potential than the cathodes 88 and 94, respectively, crystal diodes 84 and 86 will conduct. During conduction, anodes 92 and 98 will be at a potential more nearly that of their cathodes 88 and 94, respectively. Therefore, if no signal is present at either of the inputs 90 and 96, the gate output terminal 102 will be maintained at a negative potential of ten volts. If a positive signal of five volts is applied to the input terminal 90, the diode 84 will become non-conducting because the anode 92 will be at a more negative potential than the cathode 88. The voltage at the output terminal 102 will still remain at a negative potential of ten volts since the crystal diode 86 will still be conducting. In similar manner, if a positive signal of five volts appears at the input terminal 96, the diode 86 will become non-conducting because the anode 98 will be at a more negative potential than the cathode 94. The voltage of the output terminal 102 will still remain at negative potential of ten volts since the crystal diode 84 will still be conducting. In other words, the input terminal having the most negative potential will determine the voltage at the output terminal 102. Consequently, the gate 82 will produce a positive output signal of five volts at the output terminal 102 only when a positive signal of five volts is simultaneously present at the input terminals 90 and 96. It should also be noted that the gate circuit is preferably followed by a decoupling circuit so as to minimize the slight change in voltage across one of the crystal diodes when the other crystal diode disconnects.

The buffer 104 shown in Fig. 2*b* is also known as an "or" gate. It has the property of producing an output signal corresponding to the signal having the highest potential being applied to any of its inputs and also functions to isolate the input circuits from each other.

The buffer 104 comprises a plurality of germanium crystal diodes 106 and 108. The crystal diode 106 includes an anode 110 connected to the input terminal 112 and a cathode 114. Crystal diode 108 includes an anode 116 connected to the input terminal 118 and a cathode 120. The cathodes are interconnected and coupled to the negative supply bus seventy via the resistor 122. The interconnected cathodes are also connected to the output terminal 124 of the buffer 104.

When no signal is present, the anodes 110 and 116 are maintained at a negative potential of ten volts by circuit means (not shown) connected to the input terminals 112 and 118, while the cathodes 114 and 120 are initially connected to the negative supply bus seventy via resistor 122. Inasmuch as the anodes 110 and 116 are initially at a more positive potential than the cathodes 114 and 120, respectively, the crystal diodes 106 and 108 will be conducting. During conduction, the cathodes 114 and 120 will be at a potential more nearly that of its anodes 110 and 116. Therefore, if the inputs 112 and 118 are at a negative potential of ten volts, the buffer output terminal 124, which is connected to the cathodes 114 and 120, will be maintained at a negative potential of ten volts. If a positive signal of five volts is applied to the input 112, the conduction of crystal diode 106 will increase and raise the potential at the output terminal 124. In so doing, it raises the cathode potential of crystal diode 108 to a potential which is higher than the potential of the corresponding anode 116 causing it to disconnect. However, the crystal diode 106 associated with the input signal will remain conducting causing the voltage level of the output terminal 124 to increase to a positive potential of five volts. Likewise, if a signal of plus five volts is applied to the input 118, the conduction of crystal diode 108 will increase and raise the potential at the output terminal 124. In so doing it raises the cathode potential of crystal diode 106 to a potential which is higher than the potential of the corresponding anode 114 causing it to disconnect. However, the crystal diode 108 associated with the input signal will remain conducting causing the voltage level of the output terminal 124 to increase to a positive potential of five volts. Stated otherwise, the potential at the output terminal 124 will be equal to the highest input potential. Therefore, a positive signal at input terminal 112 will be passed by buffer 104 and will block a negative signal at the other input terminal 118. If a positive signal of five volts is applied to the input terminals 112 and 118, the conduction of crystal diodes 106 and 108 will increase causing the voltage level of the output terminal 124 to increase to a positive potential of five volts. Consequently, the buffer 104 will produce a positive output signal of five volts at the output terminal 124, when a positive signal of five volts is present at either or both input terminals 112 and 118.

An electrical delay line 126 of the lumped parameter type, which functions to provide discrete time delays of the input signal, is shown in Figure 2*c*.

The delay line 126 comprises a plurality of inductors 128 connected in series, with a capacitor 130 connected between a tap 131 on each inductor 128 and ground. Terminals 132 are connected to some of the taps 131 so that the total delay will vary from terminal to terminal. The delay line 126 is terminated by a resistor 138 in order to minimize reflections. A signal is fed into the delay line 126 at the input terminal 134 and the maximum delay is present at the output terminal 136.

An amplitude discriminator 140 is shown in Fig. 2*d*. The amplitude discriminator 140 has the property of producing an output signal at the output terminal 166 sufficient to trigger a delay flop (hereinafter described) when a playback signal having an amplitude equal to or greater than a given amplitude is present at the input terminal 150.

The amplitudes of the playback signals are a function of the quality of the magnetic tape. Thus, a given amplitude must be chosen arbitrarily as the acceptance level for the playback signals. The given amplitude must not be chosen too high as a large amount of tape rejection will result; conversely, the given amplitude must not be chosen too low as to require a tape reading amplifier of exceptional dynamic range.

The amplitude discriminator 140 is composed of a triode amplifier 142 and a cathode follower 143. The triode amplifier 142 has an anode 144 connected via resistor 146 to the positive bus 250, a control grid 148 connected to the input terminal 150, and a cathode 152 connected via resistor 154 to the negative supply bus ten. The cathode follower 143 has an anode 156 connected via resistor 158 to the positive supply bus 250, a control grid 160 connected to one end of a grid resistor 162, and a cathode 164 connected to the output terminal 166 and via resistor 168 to the negative supply bus seventy. The bias of cathode follower 143 is controlled by a potentiometer 170 connected between ground and the negative supply bus seventy. The movable arm 172 of potentiometer 170 is connected via resistor 174 to the other end of grid resistor 162. The anode 144 of triode amplifier 142 is coupled via capacitor 176 to the input of the cathode follower 143 which is the junction of resistors 162 and 174.

In operation, the bias on the grid 160 of cathode follower 143 is adjusted by the movable arm 172 according to the arbitrarily chosen acceptance level for the input signals of amplitude discriminator 140 so that an output signal is produced sufficient to trigger the delay flop (hereinafter described) whenever a signal is applied thereto which has an amplitude equal to or greater than the acceptance level.

As an example, with an acceptance lever chosen arbitrarily at thirty volts peak to peak, the bias on the grid 160 of cathode follower 143 is adjusted to minus thirty-seven volts which will cause a voltage of minus thirty-two volts to be maintained at the output terminal 166. When an amplified playback signal of thirty volts peak to peak is applied to the input terminal 150, it is amplified by the triode amplifier 142 to provide a peak to peak output of eighty volts. This output is superimposed on the bias on grid 160 of cathode follower 143 and produces a signal varying between minus seventy volts and plus five volts at the output terminal 166. The positive peak of this output signal is sufficient to trigger the delay flop.

Therefore, all playback signals which are equal to or greater than the arbitrarily chosen acceptance level will cause amplitude discriminator 140 to produce output signals having amplitudes sufficient to trigger the delay flop.

Write amplifier 178, which functions in a known manner to provide signal amplification, is shown in Fig. 3*a*.

Write amplifier 178 comprises an anode 182 connected to the output terminal 184 and via resistor 186 to the positive supply bus 250, a grid 188 connected via resistor 190 to the input terminal 192, and a cathode 194 connected via resistor 196 to the negative supply bus 70.

The tape reading amplifier 198 is shown in Fig. 3*b* and functions to amplify tape playback signals.

The tape reading amplifier 198 is composed of a transformer 200 and a two stage amplifier 222 including vacuum tubes 214 and 230. Transformer 200 comprises a primary winding 202 connected to the input terminals 204 and 206, a secondary winding 210 which is connected between the grid 224 of vacuum tube 214 and ground, and a core 208 provided with an electrostatic shield connected to ground to thereby prevent noise from being coupled to the grid 224 of vacuum tube 214. The vacuum tube 214 has an anode 216 which is connected via resistor 218 to the positive supply bus 250, a grid 224 connected to one end of both the secondary 210 of transformer 200 and grid resistor 212, the other end of the secondary 210 and resistor 212 being interconnected and connected to ground, and a cathode 226 connected via cathode resistor 228. The vacuum tube 230 comprises an anode 232 connected via resistor 234 to the positive supply bus 250, a grid 240 connected via grid resistor 242 to a negative supply bus 1 and a cathode 244 connected to ground. The anode 216 of vacuum tube 214 is also coupled via capacitor 246 to the grid 240 of the vacuum tube 230. The anode 232 of vacuum tube 230 is also connected via coupling capacitor 236 to the output terminal 238.

In operation, when a playback signal is applied to the primary 202 of transformer 200, the secondary 210 of transformer 200 applies an amplified signal to the amplifier 222. Amplifier 222 produces an amplified signal at the output terminal 238. Thus, tape reading amplifier 198 produces an amplified output for the input playback signals being applied between the input terminals 204 and 206.

A D.-C. amplifier 248 is shown in Fig. 3*c*. When a signal is present at the input terminal 278, a positive signal of five volts appears at the positive output terminal 312 and a negative signal of ten volts will be present at the negative output terminal 334.

The D.-C. amplifier 248 includes a one-megacycle signal source such as signal generator 271 of known type producing a signal having a frequency of one-megacycle, a gate 275, a buffer 274, a vacuum tube amplifier 280, a transformer 256, a pair of full wave rectifiers 282 and 284 and a pair of filters 286 and 288. Gate 275 and buffer 274 are shown symbolically in Fig. 3*c* as they are a gate and buffer of the type disclosed in Figs. 2*a* and 2*b*. One input of gate 275 is connected to the input terminal 278 while the other input is connected to the ouput of signal generator 271. The output of gate 275 is connected to one input of buffer 274, while the other input of buffer 271 is connected to the negative supply bus 5. The output of buffer 274 is connected to the control grid 272 of vacuum tube 280. Vacuum tube 280 is a five element tube having a grounded cylindrical shield and includes an anode 252 connected via the primary 254 of transformer 256 to the positive supply bus 250, the junction of the positive supply bus 250 and primary 254 is connected via bypass capacitor 260 to ground, a suppressor grid 266 connected to ground, a screen grid 268 connected to the positive supply bus 125 and to ground via the bypass capacitor 270, a control grid 272, and a cathode 290 connected to ground. The anode 252 of vacuum tube 280 is also connected via the decoupling capacitor 262 to a neon tube indicator 264, which, in turn, is grounded. A capacitor 258 is connected in parallel with the primary 254 of transformer 256 to form a parallel tank circuit 253.

The full wave rectifier 282 includes the secondary winding 292 having a center tap connected to the negative supply bus 10 and a pair of crystal diodes 294 and 300. The anodes 296 and 302 of crystal diodes 294 and 300 respectively are connected to the secondary winding 292 of transformer 256, while the cathodes 298 and 304 of crystal diodes 294 and 300 respectively are interconnected. The full wave rectifier 284 includes the secondary 314 having a center tap connected to the positive supply bus 5 and a pair of crystal diodes 316 and 322. The cathodes 318 and 324 of crystal diodes 316 and 322 respectively are connected to the secondary winding 314, while the anodes 320 and 326 of crystal diodes 316 and 322 respectively are interconnected.

The filter circuit 286, connected between the cathode 298 of the crystal diode 294 and the positive output terminal 312, comprises a parallel tank circuit which includes capacitor 306 and inductor 308. Capacitor 310 connects the positive output terminal 312 to the negative supply bus 10. The positive output terminal 312 is also coupled via resistor 311 to the negative supply bus 70. The filter circuit 288, connected between the anode 320 of the crystal diode 316 and the negative output terminal 334, comprises a parallel tank circuit which includes capacitor 328 and inductor 330. Capacitor 332 connects the negative output terminal 334 to the positive supply bus 5. The negative output terminal 334 is also coupled by means of the resistor 333 to the positive supply bus 65.

Initially, the crystal diodes 294 and 300 are in a conductive state such that the potential at the positive output terminal 312 is approximately minus ten volts. Similarly, the crystal diodes 316 and 322 are initially in a conductive state such that the potential at the negative output terminal 334 is approximately plus five volts. Further, inasmuch as one input of buffer 274 is connected to the negative supply bus 5, all signals at the input terminal 278 which are equal to or more positive than minus five volts will be passed by the buffer 274.

When a signal is applied to the input terminal 278 of gate 275 it is superimposed on the high frequency signal produced by signal generator 271 and passed by the buffer 274 and applied to the control grid 272 of vacuum tube 280. The signal is amplified by vacuum tube 280 and applied to the parallel tank circuit 253. The tank circuit is tuned to the frequency of the signal produced by signal generator 271 such that the maximum signal will be passed by the parallel tank circuit 253 to the full wave rectifiers 282 and 284. The full wave rectifier 282 will pass the positive portion of the signal which is then filtered by the filter 286 and appears as a positive potential of approximately five volts at the positive output terminal 312. The full wave rectifier 284 will pass the negative portion of the signal which is then filtered by the filter 288 and appears as a negative potential of approximately ten volts at the negative output terminal 334.

Thus, if no signal is present at the input terminal 278, the voltage level at the positive output terminal 312 will be minus ten volts, and the potential at the negative output terminal 334 will be plus five volts. However, if a signal is present at the input terminal 278, the voltage level at the positive output terminal 312 will be plus five volts, and the potential at the negative output terminal 334 will be minus ten volts.

A delay flop 336 is illustrated in Fig. 4*a*. The delay flap 336 functions to produce a positive signal of five volts at the positive output terminal 357 and a negative signal of ten volts at the negative output terminal 351 when a set pulse is received at the set input terminal 340. This condition will be maintained for a fixed period of time whereupon the delay flop 336 is reset and the positive output terminal 357 is returned to a negative potential of ten volts and the negative output terminal 351 is returned to a positive potential of five volts until the next set pulse is received.

The delay flop 336 is composed of a buffer 338 of the type disclosed in Fig. 2*b*, a coincidence gate 350 of the type disclosed in Fig. 2*a*, a one-megacycle signal source such as signal generator 356 of known type producing a signal having a frequency of one megacycle, a delay line 352 of the type disclosed in Fig. 2*c* and having a delay of sixty microseconds, and a D.-C. amplifier 355 of the type disclosed in Fig. 3*c*.

Buffer 338 has two inputs, one of which is connected to the set input terminal 340 and the other of which is connected to the input terminal 342. The output of buffer 338 is connectedd to a first input terminal 346 of gate 350, while the output of signal generator 356 and delay line 352 are connected to a second input terminal 344 and a third input terminal 348 respectively of gate 350. The output of the gate 350 is connected to the input terminal 354 of D.-C. amplifier 355. The positive output of D.-C. amplifier 355 is connected to the input terminal 342 of buffer 338 and to the positive output terminal 357, while the negative output of D.-C. amplifier 355 is connected to the negative output terminal 351 and to the input of the delay line 352.

Initially, the positive output of D.-C. amplifier 355 will be at a negative potential of ten volts, while the negative output of D.-C. amplifier 355 will be at a positive potential of five volts. Consequently, the input terminal 342 of buffer 338 will be at a negative potential of ten volts, and the input terminal 348 of gate 350 will be at a positive potential of five volts. Thus, inasmuch as one input of buffer 338 is at a negative potential of ten volts, all signals equal to or more positive than minus ten volts will be passed by buffer 338. Further, inasmuch as one input of gate 350 is at a positive potential of five volts, all signals equal to or more negative than plus five volts will be passed by the gate 350.

When a set pulse having a voltage swing from minus ten to plus five volts is impressed on the set input terminal 340, it is conducted through the buffer 338 to the first input terminal 346 of gate 350, while the signal generator 356 simultaneously applies a high frequency signal to the second input terminal 344 of gate 350. This high frequency signal is superimposed upon the set signal and is passed via gate 350 to the input terminal 354 of D.-C. amplifier 355. It is then amplified and rectified by D.-C. amplifier 355 to produce a positive output voltage of five volts at the positive output terminal 357 and a negative output voltage of minus ten volts at the negative output terminal 351. The positive output voltage is applied to the output terminal 357 and to the input terminal 342 or buffer 338 to supersede the original set pulse, so that the positive output signal at terminal 357 is maintained. The negative output voltage is applied to the negative output terminal 351 and to delay line 352 and is delayed for a period of sixty microseconds, thereby permitting the delay flop 336 to remain set for this period of time. After sixty microseconds the negative output signal will be applied via the delay line 352 to the input terminal 348 of gate 350 to prevent any further signals from passing through the gate 350 and thereby reset delay flop 336.

Counter stage 358 which is illustrated in Fig. 4*b* is a flip flop or bi-stable circuit which forms part of a counter and functions to count pulses being applied to the input terminal 400. The counter stage 358 comprises a pair of cross-coupled vacuum tubes 360 and 362 with a neon tube indicator 384 to indicate the set condition of the stage. Vacuum tube 360 comprises an anode 364 connected to one end of resistor 366 and to the anode 396 of crystal diode 394, a control grid 372 connected to one end of grid resistor 374, and a cathode 378 connected to ground. The vacuum tube 362 includes an anode 380 connected to one end of resistor 382 and to the anode 416 of crystal diode 414, a grid 363 coupled by means of resistor 406 to the reset terminal 408 and a cathode 388 connected to ground. The anode 364 of vacuum tube 360 is also cross coupled via the parallel connected resistor 390 and capacitor 392 to the grid 363 of vacuum tube 362. The anode 380 of vacuum tube 362 is also cross-coupled via the parallel connected resistor 412 and capacitor 410 to the other end of grid resistor 374. The junction of grid resistor 374 and resistor 412 is connected to the output terminal 376, and to the biasing terminal 424 via resistor 422. The neon tube indicator 384 is coupled between the anode 380 of vacuum tube 362 and ground via resistor 386. Input terminal 400 is connected via capacitor 420 to the junction of cathode 418 of crystal diode 414, cathode 398 of crystal diode 394, and one end of resistor 426. The other ends of resistors 366, 382 and 426 are interconnected at junction 425. The junction 425 is coupled to the positive supply bus 125 via resistor 368, to ground via the decoupling capacitor 370, and to the output terminal 428 via the coupling capacitor 427. Capacitor 420 and resistor 426 function as a differentiating circuit for the input signals being applied to the input terminal 400.

Initially, terminals 408 and 424 will be maintained at a negative potential of seventy volts by a source not shown. In order to place counter stage 358 in the normal reset condition a positive pulse signal is applied to the reset terminal 408 and via resistor 406 to the grid 363 of vacuum tube 362. If vacuum tube 362 is in a non-conductive state, the positive pulse signal will cause the vacuum tube 362 to conduct and thereby transfer conduction from vacuum tube 360 to vacuum tube 362. If vacuum tube 362 is already in a conductive state then the positive pulse signal will merely increase conduction through vacuum tube 362.

Therefore, in the reset condition vacuum tube 360 will be in a non-conductive state, while vacuum tube 362 will be in a conductive state. Consequently, the anode 396 and cathode 398 of crystal diode 394, and the cathode 418 of crystal diode 414 will be at the potential of the junction 425 while the anode 416 of crystal diode 414 will be at the lower potential of the junction of resistor 382 and anode 380 of vacuum tube 362. In this condition of counter stage 358 crystal diode 416 will be disconnected while crystal diode 394 will be slightly conducting.

When an input pulse, having a positive swing, is applied to the input terminal 400 it will be differentiated by the differentiating circuit composed of capacitor 420 and resistor 426. The positive portion of the differentiated pulse will drive the cathodes 398 and 418 of crystal diodes 394 and 414, respectively, more positive than their corresponding anodes 396 and 416 to thereby disconnect both crystal diodes 394 and 414. The positive portion of the differentiated pulse therefore has no effect on the counter stage 358.

The negative portion of the differentiated pulse will drive the cathodes 398 and 418 in a negative direction. The crystal diode 414 will still remain disconnected as the negative swing of the differentiated pulse will not be sufficient to drive cathode 418 to a more negative potential than the anode 416. However, the negative swing of the differentiated pulse will be sufficient to drive the cathode 398 of crystal diode 394 to a more negative potential than its anode 396 to thereby drive crystal diode 394 into conduction. Thus, the negative swing will be conducted via the crystal diode 394 to the grid 363 of vacuum tube 362 to cut off vacuum tube 362 and transfer conduction from vacuum tube 362 to vacuum tube 360.

The rise in potential of the anode 380 of vacuum tube 362 will cause the neon tube indicator 384 to ignite and indicate the set condition of the counter stage 358. The rise in potential will also cause a signal having a positive swing to be applied to the output terminal 428 and the junction of resistors 374, 412 and 422 to rise in potential and thereby apply a pulse having a positive swing to the output terminal 376. Further, in view of the change in condition of vacuum tubes 360 and 362, the anode 416 and cathode 418 of crystal diode 414 will be at the potential of the junction 425, while the anode 396 of crystal diode 394 will be at the lower potential of the junction of resistor 366 and anode 364 of vacuum tube 360.

When a second pulse having a positive swing is applied to the input terminal 400 and is differentiated by the differentiating circuit, the positive portion of the differentiated pulse again has no effect on crystal diodes 394 and 414, while the negative portion of the differentiated pulse will be conducted via the crystal diode 414 to the grid 372 of vacuum tube 360 to cut off vacuum tube 360 and transfer conduction from vacuum tube 360 to vacuum tube 362. The drop in potential of anode 380 of vacuum tube 362 will cause the neon tube indicator 384 to be extinguished to indicate the reset condition of the counter stage 358. The drop in potential will also cause a signal having a negative swing to be applied to the output terminal 428 and the junction of resistors 374, 412 and 422 to drop in potential and thereby apply a pulse having a negative swing to the output terminal 376.

Thus, in the reset condition of counter stage 358 vacuum tube 362 will be in a conductive state, while vacuum tube 360 will be in a non-conductive state, whereas in the set condition of counter stage 358 vacuum tube 360 will be in a conductive state, while vacuum tube 362 will be in a non-conductive state. Further, in the set condition of the counter stage 358 the neon tube indicator 384 will be ignited to indicate the set condition and a pulse having a positive swing will be applied to the output terminals 376 and 428.

Counter 36 functions to count blocks of sprocket pulse signals and is illustrated in Fig. 5.

Counter 36 comprises a ten stage binary counter with cathode followers 524 and 530 connected to the eighth and tenth stages, respectively, of counter 36 (counter stage $2^7$ and counter stage $2^9$). Each counter stage of counter 36 is of the type shown in Fig. 4*b* with the output terminal 428 of one stage connected to the input terminal 400 of the following stage to form a series or cascaded relationship. All of the reset terminals 408 are connected together and to a common reset terminal 514 which is normally maintained at a negative potential of seventy volts. All of the biasing terminals 424 are connected together and to a common biasing terminal 515 which is normally maintained at a negative potential of seventy volts. The input terminal 432 of counter 36 is connected to the input terminal 400*a* of the first counter stage. The output terminal 376*h* of the eighth stage of counter 36 is connected to one end of resistor 516, while the output terminal 376*j* of the tenth stage of counter 36 is connected to one end of resistor 538.

Cathode following 524 includes an anode 520 connected via resistor 518 to the positive supply bus 250, a grid 522 connected to the other end of resistor 516, and a cathode 526 connected to the output terminal 544, and via cathode resistor 528 to the negative supply bus 70. The cathode follower 530 includes an anode 532 connected via resistor 534 to the positive supply bus 250, a grid 536 connected to the other end of resistor 538 and a cathode 540 connected to the output terminal 546 and via cathode resistor 542 to the negative supply bus 70.

Initially, a positive pulse is applied to the common reset terminal 514 to place each counter stage in the reset condition whereby the right hand tube of each stage will be in a conductive state and the left hand tube of each stage will be in a non-conductive state (see Fig. 4*b*).

In operation the counter 36 of Fig. 5 will count the sprocket pulse signals being applied to the input terminal 432 which is connected to input terminal 400*a*. The first sprocket pulse signal applied to the input terminal 400*a* will set the first stage of counter 36 and cause a positive potential rise hereafter called a positive step function to be applied to the output terminal 428*a*. The positive step function is applied to the input terminal 400*b* of the second stage of counter 36, but has no effect thereon as the counter stages are only responsive to negative signals. The second sprocket pulse signal applied to the input terminal 400*a* will reset the first stage of counter 36 and cause a negative drop in potential, hereafter called a negative step function, to be applied to the output terminal 428*a*. The negative step function is applied to the input terminal 400*b* of the second stage of counter 36 and operates to set the second stage of counter 36 such that a positive step function now appears at the output terminal 428*b* of the second stage. This positive step function is applied to the third stage of counter 36 but has no effect thereon.

Inasmuch as the succeeding stages of counter 36 are similarly connected and a neon tube indicator is connected to each stage, a binary counter is provided wherein the set condition of the first stage of counter 36 represents a count of one sprocket pulse signal, the set condition of the second stage of counter 36 represents a count of two sprocket pulse signals, the set condition of the first and second stages of counter 36 represents a count of three sprocket pulse signals, and so on.

When the total count in counter 36 reaches 512, representing 512 sprocket pulse signals, a positive step function will be applied to the output terminal 376*j* and via resistor 538 to the grid 536 of cathode follower 530. This positive step function will cause an increase of conduction through the cathode follower 530 and thereby produce a positive rise in potential at the output terminal 546. When the total sprocket pulse count has reached 640 a positive step function will be applied to the output terminal 376*h* and via resistor 516 to the grid 522 of cathode follower 524. This positive step function will cause an increase of conduction through cathode follower 524 and thereby produce a positive rise in potential at the output terminal 544.

To reset all the stages of the counter 36 a positive pulse is applied to the common reset terminal 514 to thereby permit counter 36 to count another block of sprocket pulse signals after a predetermined period of time.

*Detailed description of the apparatus for processing a magnetic tape*

The apparatus for processing the non-sprocketed tape illustrated in Fig. 1 is shown in detail in Fig. 6.

The present invention will be described with reference to a magnetic tape which is laterally divided into three longitudinal channels. However, it should be noted that the processing apparatus need not necessarily be limited to a three channel tape but may be used with any multiple channel tape.

Associated with each channel of magnetic tape 2 is a reading-recording head 8*a*, 8*b* and 8*c* having a coil winding 1, 5 and 7, respectively.

Each of the coil windings 1, 5 and 7 is connected to a switching circuit 3*a*, 3*b* and 3*c*. The function of the switching circuits 3*a*, 3*b* and 3*c* is threefold, namely, to transmit recording pulse signals to the reading-recording heads 8*a*, 8*b* and 8*c* via the lower contacts and contact arms of relays 40, 28 and 22, respectively; or to transmit pulse signals recorded on the magnetic tape 2 to the examiners 32, 44 and 48 via the contact arms and upper contacts of relays 40—41, 28—29 and 22—23, respectively; or to transmit pulse signals recorded on the magnetic tape 2 in inverted form to examiners 32, 44, and 48 via the contact arms and upper contacts of relays 40, 28 and 22 and the cross-connected lower contacts and contact arms of relays 41, 29 and 23, respectively. Relays 40 28, 22, 41, 29 and 23 are connected between a positive supply bus and ground via switches 42, 30, 20, 43, 31 and 25, respectively.

The outputs of switching circuits 3*a*, 3*b*, and 3*c* are connected to examiners 32, 44 and 48 respectively. Each of the examiners 32, 44 and 48 includes a tape reading amplifier 198*a*, 198*b* and 198*c* respectively of the type disclosed in Fig. 3*b*, an amplitude discriminator 140*a*, 140*b* and 140*c* respectively of the type disclosed in Figure 2*d*, and a delay flop 336*a*, 336*b* and 336*c* respectively, of the type disclosed in Figure 4*a*.

Each of the delay flops 336*a*, 336*b* and 336*c* is set for a period of 60 microseconds by pulse signals read from the magnetic tape 2 after which they are automatically reset. The delay period is chosen such that there is sufficient time to record a signal read from one channel onto a second channel and reset the delay flop so as to be responsive to a succeeding signal before the succeeding signal is read from the first channel.

The output of each of the examiners 32, 44 and 48 is connected to recorder 24. More specifically, the output of examiner 32 is connected to the upper contact of relay 9 and to a delay line 126*a* which provides a fifteen micro-second delay in one instance and a twenty-one micro-second delay for playback signals in another instance. The fifteen micro-second output terminal of delay line 126*a* is connected to the lower contact of relay 9. Relay 9 is connected between a positive supply bus and ground via switch 11. The twenty-one micro-second output terminal of delay line 126*a* is connected to the lower contact of relay 13, and the contact arm of relay 9 is connected to the upper contact of relay 13. Relay 13 is connected between a positive supply bus and ground via switch 15.

The contact arm of relay 13 is connected to one input of a buffer 104*a* of the type disclosed in Fig. 2*b*. The other input of buffer 104*a* is connected to a negative supply bus via resistor 39 and to a positive supply bus via switch 37. The output of buffer 104*a* is connected to one input of a gate 82*a*, of the type disclosed in Fig. 2*a* and, depending upon the step in the process being carried on, functions to transfer three types of signals to gate 82*a*, namely, a signal produced by examiner 32, or a signal produced by examiner 32 but delayed fifteen micro-seconds, or a signal produced by examiner 32 but delayed twenty-one micro-seconds.

The output of examiner 48 is connected to the upper contact of relay 17 and to delay line 126*b* which provides a fifteen micro-second delay from playback signals. The output terminal of delay line 126*b* is connected to the lower contact of relay 17. Relay 17 is connected between a positive supply bus and ground via switch 19.

The output of examiner 44 is connected to the upper contact of relay 21, and the contact arm of relay 17 is connected to the lower contact of relay 21. Relay 21 is connected between a positive supply bus and ground via switch 27.

The contact arm of relay 21 is connected to one input of a buffer 104*b*, of the type disclosed in Fig. 2*b*. The other input of buffer 104*b* is connected to a negative supply bus via resistor 33 and to a positive supply bus via switch 45. The output of buffer 104*b* is connected to a second input of gate 82*a* and, depending upon the step in the process being carried on, functions to transfer three types of signals to gate 82*a*; namely, a signal produced by examiner 44 or a signal produced by examiner 48 or a signal produced by examiner 48 but delayed fifteen microseconds.

The third input of gate 82*a* is connected to a positive supply bus via resistor 49 and to a negative supply bus via switch 47. The output of gate 82*a* is connected to a D.-C. amplifier 248*a*, of the type disclosed in Fig. 3*c*, and functions to pass, if properly conditioned, the playback signals from the particular channel being read.

The positive output of D.-C. amplifier 248*a* is applied to one input of a gate 82*b*, of the type disclosed in Fig. 2*a*, while the negative output of D.-C. amplifier 248*a* is applied to a second input of gate 82*b* via a four micro-second delay line 126*c*. A positive supply bus is connected via resistor 53 and a negative supply bus is connected via switch 51 to a third input of gate 82*b*. A fourth input of gate 82*b* is connected to an output lead of recorder and counter control 34. Gate 82*b* under control of recorder and counter control 34 functions to pass, for a period of four microseconds, the playback signals from the particular channel that is being read.

A pulse generator 55 such as blocking oscillator of known type which produces narrow pulses having a period of one microsecond is connected to one input of a gate 82c of the type disclosed in Fig. 2*a*. The other input of gate 82c is connected to a negative supply bus via a resistor 59 and to a positive supply bus via switch 57. The output of gate 82c is connected to one input of a buffer 104c, of the type disclosed in Fig. 2*b*, while the output of gate 82b is connected to the other input of buffer 104c.

The output of buffer 104c is connected to a write delay flop 61 and serves two functions; namely, to pass the initial recording pulse signals from pulse generator 55, and to subsequently pass pulse signals that are recorded on each of the channels of magnetic tape 2. The write delay flop 61 is set for a period of fifteen microseconds such that the write pulses which are recorded on the magnetic tape 2 have a pulse width of fifteen microseconds. The positive output of write delay flop 61 is connected to the input terminal 432 of counter 36, while the negative output of write delay flop 61 is connected to a write amplifier 178a of the type disclosed in Fig. 3*a*.

Write amplifier 178a functions to erase all pulse signals previously recorded in the channel to which it is connected and to record new pulse signals in said channel.

Write amplifier 178a is normally in a conductive state such that when a reading-recording head is connected thereto electron current will flow through the head to ground, whereas when a recording pulse signal is applied to the write amplifier 178a, from write delay flop 61, it will cut off write amplifier 178a and cause electron current to flow in an opposite direction, namely, from ground through the head. Thus, write amplifier 178a will erase all previously recorded pulse signals when it is in a normal state and record new pulse signals whenever a recording pulse signal is applied thereto from the write delay flop 61.

Write amplifier 178a is connected to the lower contacts of relays 40, 28 and 22 and applies a recording pulse signal train to one of the channels of magnetic tape 2 depending upon which of the relays 40, 28 or 22 is energized.

Counter 36 is a ten stage binary counter of the type disclosed in Figure 5, the eighth and tenth stage being connected via the output terminals 544 and 546 to a gate 82d, of the type disclosed in Fig. 2*a*.

Counter 36 functions during the final step of the processing operation to count blocks of sprocket pulse signals, each block being composed of 640 sprocket pulse signals. Thus, counter 36 after having counted a block of sprocket pulse signals will pass a signal via gate 82d to operate space delay flop 64. The space delay flop 64 is set for a period of forty milliseconds after which it is reset.

The negative output of space delay flop 64 is connected to gate 82b via a four microsecond delay line 126d and operates to block gate 82b from passing pulse signals for a period of forty milliseconds to thereby provide space intervals between blocks of sprocket pulse signals. The positive output of space delay flop 64 is connected, via the differentiating circuit 71, to a pulse amplifier 68.

The output of pulse amplifier 68 is connected to the lower contact of relay 67. The common reset terminal 514 of counter 36 is connected via the contact arm and upper contact of relay 67 to a positive supply bus. Relay 67 is connected between a positive supply bus and ground via switch 69.

*Detailed description of the method of processing a magnetic tape*

The method of processing a three channel magnetic tape will now be described in detail with reference to the apparatus shown diagrammatically in Fig. 6.

Each channel of the magnetic tape is theoretically divided into a plurality of discrete areas, each area having a period of 200 microseconds as shown in Fig. 7. However, in order to insure a relatively complete test, it is only necessary to examine that portion of each discrete area upon which information is to be recorded. This examined portion need only be divided into two sub-areas of examination, but an extra sub-area overlapping the other sub-areas (see Fig. 7) is examined to insure that the portion of each discrete area upon which information is to be recorded has acceptable magnetic properties. Therefore, the examined portion of each discrete area of the magnetic tape is subdivided into three sub-areas (as shown in Fig. 7) with the center sub-area overlapping the two end sub-areas. Since the flux patterns spread well beyond the boundaries defined by the recording pulses, a safe test is made even though there may be some inaccuracy in the placement of successive test recordings.

The method described always uses the initial recording to define the test area in each pass, so that in the last step of processing, the sprocket pulse signal is recorded in almost the same position as in the initial recording (see Fig. 7).

Referring generally to Figs. 6 and 7 the processing operation steps will be described in ten steps as follows:

*Step 1*

Step 1 involves the initial recording of a pulse signal train on a first channel of magnetic tape 2, shown in Figure 6, hereinafter called channel A.

Switch 42 is closed to energize relay 40 and connect reading-recording head 8a in a recording circuit via the contact arms of relay 40; switch 57 in the recorder 24 is closed to condition gate 82c to pass the initial recording pulse signals from pulse generator 55; and switch 47 in the recorder 24 is closed to negatively bias and block gate 82a and thereby prevent any stray signals from any of the other channels from being recorded on magnetic tape 2.

The output of pulse generator 55 is passed through positively conditioned gate 82c and via buffer 104c to trigger write delay flop 61. Write delay flop 61 produces a series of recording pulse signals A, one of which is shown in Fig. 7, which is amplified by write amplifier 178a and applied by means of the lower contact and lower contact arm of relay 40 to one terminal of reading-recording head 8a. The upper contact arm of relay 40 grounds the other terminal of the reading-recording head 8a to complete the recording circuit for channel A. Magnetic tape 2 being fed in a forward direction has a pulse signal train recorded in channel A. The recording pulse signals A produce the magnetization flux patterns F one of which is shown in Fig. 7.

*Step 2*

The second step in processing the magnetic tape 2 involves the transfer of pulse signals recorded in channel A, which have an amplitude when read equal to or greater than a given standard, to one sub-area of a second channel of magnetic tape 2 shown in Fig. 6, hereafter called channel B.

Switch 42 is open to de-energize relay 40 and connect the reading-recording head 8a in a reading circuit via switching circuit 3a. Switch 30 is closed to energize relay 28 and connect reading-recording head 8b in a recording circuit via the contact arms of relay 28. Switch 45 in the recorder 24 is closed to apply a positive voltage via buffer 104b to condition the input of gate 82a. The magnetic tape 2 is then moved in a reverse direction.

The reading-recording head 8a senses the flux patterns F recorded on the magnetic tape 2 and produces a series of playback signals E (one of which is shown in Fig. 7) which is applied via switching circuit 3a to examiner 32.

Examiner 32 functions to transmit the playback signals E to recorder 24 for each discrete area of channel A examined which has magnetic properties equal to or greater than a given standard as indicated by the amplitude of each of the pulse signals generated in the reading-recording head 8*a* as the pulse signal train recorded in channel A is played back. More specifically, playback signals E are amplified by tape reading amplifier 198*a* and applied to amplitude discriminator 140*a*. If the amplitude of the amplified playback signal is of sufficient magnitude indicating acceptable magnetic properties, it will be passed by the amplitude discriminator 140*a* to trigger the delay flop 336*a*.

The output of delay flop 336*a* is applied to recorder 24 to produce a second series of recording pulse signals B1 (one of which is shown in Fig. 7). More specifically, the output of examiner 32 is applied via the upper contact and contact arm of relay 9, the upper contact and contact arm of relay 13 and buffer 104*a* to a second input of gate 82*a*. Inasmuch as the other two inputs of gate 82*a* are in a positive condition due to the positive output of buffer 104*a* and the positive voltage source being applied via resistor 49, the pulse signal train is passed by gate 82*a* and applied to D.-C. amplifier 248*a*.

The positive output of D.-C. amplifier 248*a* is applied to one input of gate 82*b*, while the negative output of D.-C. amplifier 248*a* is applied via a four microsecond delay line 126*c* to a second input of gate 82*b*. The remaining inputs of gate 82*b* are in a positive condition due to the positive output of recorder and counter control 34 and the positive voltage source being applied via resistor 53, so that the positive output of D.-C. amplifier 248*a* will be passed by gate 82*b* and via buffer 104*c* to trigger the write delay flop 61. The negative output of D.-C. amplifier 248*a* will be delayed four microseconds by the delay line 126*c* before deconditioning gate 82*b* so as to give the positive output of D.-C. amplifier 248*a* sufficient time to trigger write delay flop 61.

The write delay flop 61 produces the second series of recording pulse signals B1 which are applied to both the input terminal 432 of counter 36 and to write amplifier 178*a*. Inasmuch as counter 36 is maintained in a reset condition due to the positive source being applied to the common reset terminal 514, via the upper contact and contact arm of relay 67, it will not be affected by the output of write delay flop 61. However, the write amplifier 178*a* amplifies the recording pulse signals B1 and applies them to one terminal of the reading-recording head 8*b* by means of the lower contact and contact arm of the energized relay 28. The upper contact arm of relay 28 grounds the other terminal of the reading-recording head 8*b* to complete the recording circuit for channel B. A series of recording pulse signals are thereby recorded in a first sub-area of channel B corresponding to those pulse signals which were recorded in channel A and which had amplitudes when read equal to or greater than a given standard as determined by the examiner 32. The recording pulse signals B1 produce the magnetization flux patterns F1 one of which is shown in Figure 7.

*Step 3*

The third step in processing the magnetic tape 2 involves the transfer of pulse signals recorded in the first sub-area of channel B, which when read have an amplitude equal to or greater than a given standard, to a first sub-area of a third channel of magnetic tape 2 shown in Fig. 6 hereinafter called channel C.

Switch 30 is opened to de-energize relay 28 and connect the reading-recording head 8*b* in a reading circuit via switching circuit 3*b*. Switch 20 is closed to energize relay 22 and connect reading-recording head 8*c* in a recording circuit via the contact arms of relay 22. Switch 15 in the recorder 24 is closed to energize relay 13 and thereby connect the twenty-one microsecond delay output terminal of delay line 126*a* to one input of buffer 104*a*.

The magnetic tape 2 is then moved in a forward direction. The reading-recording head 8*b* senses the series of flux patterns F1 recorded in the first sub-areas of channel B and produces a series of playback signals EB1 (one of which is shown in Fig. 7) which is applied via switching circuit 3*b* to examiner 44.

Examiner 44 functions to transmit the playback signals EB1 to recorder 24 for each sub-area of channel B examined which has magnetic properties equal to or greater than a given standard as indicated by the amplitude of the pulse signals generated in the reading-recording head 8*b* as the pulse signal train recorded in channel B is played back. More specifically, the playback signals EB1 are amplified by the tape reading amplifier 198*b* and applied to the amplitude discriminator 140*b*. If the amplitude of the amplified playback signal is of sufficient magnitude it will be passed by the amplitude discriminator 140*b* to trigger delay flop 336*b*. The output of delay flop 336*b* is applied to recorder 24.

Inasmuch as the reading-recording head 8*a* is still connected in a reading circuit via switching circuit 3*a*, reading-recording head 8*a* again senses the flux patterns F recorded in channel A and produces another series of playback signals E which are applied via switching circuit 3*a* to examiner 32.

The output of examiner 32 is applied to recorder 24 which now functions to produce a third series of recording pulse signals C1 (one of which is shown in Fig. 7). More particularly, the output of examiner 44 is applied via the upper contact and contact arm of relay 21 and buffer 104*b* to a first input of gate 82*a*. A second input of gate 82*a* is connected to a positive supply bus via resistor 49. These two inputs function to condition gate 82*a* to pass positive pulse signals via the third input of gate 82*a*.

The output of examiner 32 is applied to delay line 126*a* to provide a twenty-one microsecond delay for the playback signals E. The delayed playback signals E are applied via the lower contact and contact arm of the energized relay 13 and buffer 126*a* to the third input of gate 82*a*. The pulse signal train is passed by gate 82*a* and applied to D.-C. amplifier 248*a*.

The positive output of D.-C. amplifier 248*a* is applied to one input of gate 82*b*, while the negative output of D.-C. amplifier 248*a* is applied via a four microsecond delay line 126*c* to a second input of gate 82*b*. The remaining inputs of gate 82*b* are in a positive condition, due to the positive output of recorder and counter control 34 and the positive voltage source being applied via resistor 53, so that the positive output of D.-C. amplifier 248*a* will be passed by gate 82*b* and via buffer 104*c* to trigger the write delay flop 61.

The write delay flop 61 produces the third series of recording pulse signals C1 which are applied to write amplifier 178*a*. Write amplifier 178*a* amplifies the recording pulse signals and applies them to one terminal of the reading-recording head 8*c* by means of the lower contact and contact arm of the energized relay 22. The upper contact arm of relay 22 grounds the other terminal of the reading-recording head 8*c* to complete the recording circuit for channel C. A series of recording pulse signals are thereby recorded in a first sub-area of channel C corresponding to those pulse signals which were recorded in the first sub-area of channel B and which when read had amplitudes equal to or gerater than a given standard. The recording pulse signals C1 produce a corresponding magnetic flux pattern in channel C of magnetic tape 2.

*Step 4*

The fourth step in processing the magnetic tape 2 involves the transfer of pulse signals recorded in the first sub-area of channel C, which when read have an amplitude equal to or greater than a given standard, to a third sub-area of channel B.

Switch 20 is opened to de-energize relay 22 and connect the reading-recording head 8*c* in a reading circuit via switching circuit 3*c*. Switch 15 is opened to de-energize relay 13. Switch 30 is closed to energize relay 28 and connect reading-recording head 8*b* in a recording circuit via the contact arms of relay 28. Switch 11 in the recorder 24 is closed to energize relay 9 and thereby connect the fifteen microsecond delay output terminal of delay line 126a to one input of buffer 104a via the upper contact and contact arm of relay 13. Switch 43 is closed to energize relay 41 to thereby cause switching circuit 3a to invert the output of reading-recording head 8a. Switch 27 in recorder 24 is closed to energize relay 21 to connect the output of examiner 48 to one input of buffer 104b via the upper contact and contact arm of relay 17 and the lower contact and contact arm of relay 21.

The magnetic tape 2 is then moved in a reverse direction. The reading-recording head 8c senses the flux patterns recorded in the first sub-area of channel C and produces a series of playback signals EC1 (one of which is shown in Fig. 7) which is applied via switching circuit 3c to examiner 48.

Examiner 48 functions to transmit the playback signals EC1 to recorder 24 for each sub-area 1 of channel C examined hwich has magnetic properties equal to or greater than a given standard as indicated by the amplitude of the pulse signals generated in the reading-recording head 8c as the pulse signal train recorded on channel C is played back. More specifically, the playback signals EC1 are amplified by the tape reading amplifier 198c and applied to the amplitude discriminator 140c. If the amplitude of the amplified playback signal is of sufficient magnitude, it will be passed by the amplitude discriminator 140c to trigger the delay flop 336c. The output of delay flop 336c is applied to recorder 24.

Inasmuch as the reading-recording head 8a is still connected in a reading circuit via switching circuit 3a, reading-recording head 8a again senses the flux patterns F recorded in channel A and produces another series of playback signals E which are applied to switching circuit 3a. Switching circuit 3a is now in condition to invert the playback signals E so that the positive rise of the playback signals will occur later in time than the negative rise of the playback signals (see Fig. 7) and in effect provide a delay for the positive portion of the playback signals. The inverted playback signals are then applied to examiner 32.

The output of examiner 32 is applied to recorder 24 which now functions to produce a fourth series of recording pulse signals B3 (one of which is shown in Fig. 7). More specifically, the output of examiner 48 is applied via the upper contact and contact arm of relay 17, the lower contact and contact arm of the energized relay 21 and buffer 104b to the first input of gate 82a. The second input of gate 82a is connected to a positive supply bus via resistor 49. These two inputs function to condition gate 82a to pass positive pulse signals via the third input of gate 82a.

The output of examiner 32 is applied to delay line 126a which provides a fifteen microsecond delay for the inverted playback signals E. The inverted and delayed playback signals E are applied via the lower contact and contact arm of the energized relay 9, the upper contact and contact arm of relay 13 and buffer 104a to the third input of gate 82a. The pulse signal train is passed by gate 82a and applied to D.-C. amplifier 248a.

The positive output of D.-C. amplifier 248a is applied to one input of gate 82b, while the negative output of D.-C. amplifier 248a is applied via a four microsecond delay line 126c to a second input of gate 82b. The remaining inputs of gate 82b are in a positive condition due to the positive output of recorder and counter control 34 and the positive voltage source being applied via resistor 53, so that the positive output of D.-C. amplifier 248a will be passed by gate 82b and via buffer 104c to trigger the write delay flop 61.

The write delay flop 61 produces the fourth series of recording pulse signals B3 which are applied to write amplifier 178a.

The output of write amplifier 178a is connected to one terminal of the reading-recording head 8b by means of the lower contact and contact arm of relay 28. The upper contact arm of relay 28 grounds the other terminal of reading-recording head 8b to complete an erasing and recording circuit for channel B. As the magnetic tape 2 passes under the reading-recording head 8b, write amplifier 178a erases the pulse signal train previously recorded in the first sub-areas of channel B, in a manner previously described, and records the new pulse signal train in the third sub-areas of channel B. The first signal train is erased from the first sub-areas of channel B in order to prevent the flux pattern of the first signal train from producing playback signals corresponding to defective portions of the third sub-areas of channel B. For example, referring to Fig. 7, if a third sub-area of channel B is defective the flux pattern such as F3 will not be produced. Therefore, in the fifth step of the processing operation no playback signal EB3 will be produced. However, if the flux pattern F1 is retained in the first sub-area of channel B, during the fifth step of the processing operation a playback signal EB1 will be produced even though the third sub-area is defective.

Therefore, in order to avoid producing such error signals provision is made, as described hereinbefore, to erase any previous recorded pulse signal before a new recording pulse signal is applied to the reading-recording head being used. This erase and record function is performed in every step of the processing operation whenever a recording pass is made on the magnetic tape 2.

The fourth series of recording pulse signals are thereby recorded in the third sub-area of channel B corresponding to those pulse signals which were recorded in the first sub-area of channel C and which when read have an amplitude equal to or greater than a given standard. The recording pulse signals B3 produce the magnetic flux patterns F3 one of which is shown in Fig. 7.

*Step 5*

The fifth step in processing the magnetic tape 2 involves the transfer of pulse signals recorded in the third sub-area of channel B, which when read have amplitudes equal to or greater than a given standard, to a second sub-area of channel C.

Switch 30 is opened to de-energize relay 28 and connect the reading-recording head 8b in a reading circuit via switching circuit 3b. Switch 20 is closed to energize relay 22 and connect reading-recording head 8c in a recording circuit via the contact arms of relay 22. Switch 11, switch 43 and switch 27 are opened to de-energize relays 9, 41 and 21 respectively.

The magnetic tape 2 is then moved in a forward direction. The reading-recording head 8b senses the flux patterns recorded in the third sub-area of channel B and produces a series of playback signals EB3 (one of which is shown in Fig. 7) which is applied via switching circuit 3b to examiner 44.

Examiner 44 functions to transmit the playback signals EB3 to recorder 24 for each examined sub-area of channel B which has acceptable magnetic properties. More specifically, the playback signals EB3 are amplified by the tape reading amplifier 198b and applied to the amplitude discriminator 140b. If the amplitude of the amplified playback signal is of sufficient magnitude, it will be passed by the amplitude discriminator 140b to trigger the delay flop 336b. The output of the delay flop 336b is applied to recorder 24.

Inasmuch as the reading-recording head 8a is still connected in a reading circuit via switching circuit 3a, reading-recording head 8a again senses the flux patterns F recorded in channel A and produces another series of playback signals E which are applied via switching circuit 3a to examiner 32.

The output examiner 32 is applied to recorder 24 which now functions to produce a fifth series of recording pulse signals C2 (one of which is shown in Fig. 7). More specifically, the output of examiner 44 is applied via the upper contact and contact arm of relay 21 and buffer 104*b* to a first input of gate 82*a*. A second input of gate 82*a* is connected to a positive supply bus via resistor 49. These two inputs function to condition gate 82*a* to pass positive pulse signals via the third input of gate 82*a*.

The output of examiner 32 is applied via upper contact and contact arm of relay 9, upper contact and contact arm of relay 13 and buffer 104*a* to the third input of gate 82*a*. The pulse signal train is passed by gate 82*a* and applied to D.-C. amplifier 248*a*.

The positive output of D.-C. amplifier 248*a* is applied to one input of gate 82*b* while the negative output of D.-C. amplifier 248*a* is applied via a four microsecond delay line 126*c* to a second input of gate 82*b*. The remaining inputs of gate 82*b* are in a positive condition, due to the positive output of recorder and counter control 34 and the positive voltage source being applied via resistor 53, so that the positive output of D.-C. amplifier 248*a* will be passed by gate 82*b* and via buffer 104*c* to trigger the write delay flop 61.

The write delay flop 61 produces the fifth series of recording pulse signals C2 which are applied to write amplifier 178*a*. Write amplifier 178*a* is connected to one terminal of the reading-recording head 8*c* by means of the lower contact and lower contact arm of relay 22. The upper contact arm of relay 22 grounds the other terminal of reading-recording head 8*c* to complete the erasing and recording circuit for channel C. Write amplifier 178*a* operates to erase the pulse signal train C1 previously recorded in the first sub-areas of channel C and record the fifth series of pulse signals in the second sub-areas of channel C corresponding to those pulse signals which were recorded in the third sub-areas of channel B and which when read have amplitudes equal to or greater than a given standard. The recording pulse signals C2 produce a corresponding magnetic flux pattern in channel C of magnetic tape 2.

*Step 6*

The sixth step of processing the magnetic tape 2 involves the transfer of pulse signals recorded in the second sub-area of channel C, which have amplitudes when read equal to or greater than a given standard, to a second sub-area of channel B.

Switch 20 is opened to de-energize relay 22 and connect the reading-recording head 8*c* in a reading circuit via switching circuit 3*c*. Switch 30 is closed to energize relay 28 and connect reading-recording head 8*b* in a recording circuit via the contact arms of relay 28. Switch 27 is closed to energize relay 21 to thereby connect the output of examiner 48 to one input of buffer 104*b* via the upper contact and contact arm of relay 17 and the lower contact and contact arm of relay 21. Switch 15 is closed to energize relay 13 to thereby connect the twenty-one microsecond delay output terminal of delay line 126*a* to one input of buffer 104*a* via the lower contact and contact arm of relay 13.

The magnetic tape 2 is then moved in a reverse direction. The reading-recording head 8*c* senses the flux patterns recorded in the third sub-area of channel C and produces a series of playback signals EC2 (one of which is shown in Fig. 7) which is applied via switching circuit 3*c* to examiner 48.

Examiner 48 functions to transmit the playback signals EC2 to recorder 24 for each examined sub-area of channel C which has acceptable magnetic properties. More specifically, the playback signals EC2 are amplified by the tape reading amplifier 198*c* and applied to the amplitude discriminator 140*c*. If the amplitude of the amplified playback signal is of sufficient magnitude, it will be passed by the amplitude discriminator 140*c* to trigger the delay flop 336*c*. The output of delay flop 336*c* is applied to recorder 24.

Inasmuch as the reading-recording head 8*a* is still connected in a reading circuit via switching circuit 3*a*, reading-recording head 8*a* again senses the flux patterns F recorded in channel A and produces another series of playback signals E which are applied via switching circuit 3*a* to examiner 32.

The output of examiner 32 is applied to recorder 24 which now functions to produce a sixth series of recording pulse signals B2 (one of which is shown in Fig. 7). More specifically the output of examiner 48 is applied via the upper contact and contact arm of relay 17, the lower contact and contact arm of relay 21 and buffer 104*b* to the first input of gate 82*a*. A second input of gate 82*a* is connected to a positive supply bus via resistor 49. These two inputs function to condition gate 82*a* to pass positive pulse signals via the third input to gate 82*a*.

The output of examiner 32 is applied to delay line 126*a* to provide a twenty-one microsecond delay for the playback signals E. The delayed playback signals E are applied via the lower contact and contact arm of relay 13 and buffer 104*a* to the third input of gate 82*a*. The pulse signal train is passed by gate 82*a* and applied to D.-C. amplifier 248*a*.

The positive output of D.-C. amplifier 248*a* is applied to one input of gate 82*b*. The negative output of D.-C. amplifier 248*a* is applied via a four microsecond delay line 126*c* to a second input of gate 82*b*. The remaining inputs of gate 82*b* are in a positive condition due to the positive output of recorder and counter control 34 and the positive voltage source being applied via resistor 53 so that the positive output of D.-C. amplifier 248*a* will be passed by gate 82*b* and via buffer 104*c* to trigger the write delay flop 61.

The write delay flop 61 produces the sixth series of recording pulse signals B2 which are applied to write amplifier 178*a*. Write amplifier 178*a* is connected to one terminal of the reading-recording head 8*b* by means of the lower contact and lower contact arm of relay 28. The upper contact arm of relay 28 grounds the other terminal of reading-recording head 8*b* to complete the erasing and recording circuit for channel B. Write amplifier 178*a* operates to erase the pulse signal train B3 previously recorded in the third sub-areas of channel B and records the sixth series of pulse signals in the second sub-areas of channel B corresponding to those pulse signals which were recorded in the second sub-area of channel C and which when read have amplitudes equal to or greater than a given standard. The recording signals B2 produce the magnetic flux patterns F2 one of which is shown in Fig. 7.

*Step 7*

The seventh step of processing the magnetic tape 2 is a dead run with no transfer. It merely serves the purpose of rewinding the magnetic tape 2 in a forward direction.

Switches 27 and 15 are opened to de-energize relays 21 and 13 respectively. Switch 51 is closed to negatively bias gate 82*b* to thereby prevent signals from any of the channels from being recorded on magnetic tape 2 during the rewind operation.

*Step 8*

The eighth step in processing the magnetic tape 2 involves the transfer of pulse signals recorded in the second sub-area of channel B, which when read have amplitudes equal to or greater than a given standard, to a third sub-area of channel C.

Switch 30 is opened to de-energize relay 28 and connect the reading-recording head 8*b* in a reading circuit via switching circuit 3*b*. Switch 20 is closed to energize relay 22 and connect reading-recording head 8*c* in a recording circuit via the contact arms of relay 22. Switch 11 is closed to energize relay 9 to thereby connect the fifteen microsecond delay output terminal of delay line 126*a* to one input of buffer 104*a* via the lower contact and contact arm of relay 9 and the upper contact and contact arm of relay 13. Switch 43 is closed to energize relay 41 to thereby cause switching circuit 3*a* to invert the output of reading-recording head 8*a*.

The magnetic tape 2 is then moved in a reverse direction. The reading-recording head 8*b* senses the flux patterns F2 recorded in the second sub-area of channel B and produces a series of playback signals EB2 (one of which is shown in Fig. 7) which are applied via switching circuit 3*b* to examiner 44.

Examiner 44 functions to transmit the playback signals EB2 to recorder 24 for each examined sub-area of channel B which has acceptable magnetic properties. More specifically the playback signals EB2 are amplified by the tape reading amplifier 198*b* and applied to the amplitude discriminator 140*b*. If the amplitude of the amplified playback signal is of sufficient magnitude, it will be passed by the amplitude discriminator 140*b* to trigger the delay flop 336*b*. The output of delay flop 336*b* is applied to recorder 24.

Inasmuch as the reading-recording head 8*a* is still connected in a reading circuit via switching circuit 3*a*, reading-recording head 8*a* again senses flux patterns F recorded in channel A and produces another series of play-back signals E which are applied to switching circuit 3*a*. Switching circuit 3*a* is now in condition to invert the play-back signals E which are then applied to examiner 32.

The output of examiner 32 is applied to recorder 24 which now functions to produce a seventh series of recording pulse signals C3 (one of which is shown in Fig. 7). More specifically, the output of examiner 44 is applied via the upper contact and contact arm of relay 21 and buffer 104*b* to a first input of gate 82*a*. A second input of gate 82*a* is connected to a positive supply bus via resistor 49. These two inputs function to condition gate 82*a* to pass positive pulse signals via the third input to gate 82*a*.

The output of examiner 32 is applied to delay line 126*a* to provide a fifteen microsecond delay for the inverted playback signals E. The inverted and delayed playback signals E are applied via the lower contact and contact arm of the energized relay 9, the upper contact and contact arm of relay 13 and buffer 104*a* to the third input of gate 82*a*. The pulse signal train is passed by gate 82*a* and applied to D.-C. amplifier 248*a*.

The positive output of D.-C. amplifier 248*a* is applied to one input of gate 82*b*, while the negative output of D.-C. amplifier 248*a* is applied via four microsecond delay line 126*c* to a second input of gate 82*b*. The remaining inputs of gate 82*b* are in a positive condition, due to the positive output of recorder and counter control 34 and the positive voltage source being applied via resistor 53, so that the positive output of D.-C. amplifier 248*a* will be passed by gate 82*b* and via buffer 104*c* to trigger the write delay flop 61.

The write delay flop 61 produces the seventh series of recording pulse signals C3 which are applied to write amplifier 178*a*. Write amplifier 178*a* is connected to one terminal of the reading-recording head 8*c* by means of the lower contact and lower contact arm of relay 22. The upper contact arm of relay 22 grounds the other terminal of reading-recording head 8*c* to complete the erasing and recording circuit for channel C. Write amplifier 178*a* operates to erase the pulse signal train C2 previously recorded in the second sub-areas of channel C and records the seventh series of pulse signals in the third sub-areas of channel C corresponding to those pulse signals which were recorded in the second sub-areas of channel B and which when read have amplitudes equal to or greater than a given standard. The recording pulse signals C3 produce a corresponding magnetic flux pattern on the magnetic tape 2.

*Step 9*

The ninth step in processing magnetic tape 2 involves the transfer of pulse signals recorded in the third sub-area of channel C which when read have amplitudes equal to or greater than a given standard, to channel A, which is termed the sprocket channel of magnetic tape 2. Thus a completely processed magnetic tape 2 has a sprocket pulse signal recorded in each discrete area of channel A which corresponds to the adjacent positions in channels B and C which have acceptable magnetic properties. The sprocket pulse signals are recorded in spaced blocks of signals on the sprocket channel, each block comprising 640 sprocket signals corresponding to blocks of information to be recorded on the magnetic tape 2.

Switch 42 is closed to energize relay 40 and connect reading-recording head 8*a* in a recording circuit via the contact arms of relay 40. Switches 20, 11 and 43 are open to de-energize relays 22, 9 and 41 respectively. Switches 19 and 27 are closed to energize relays 17 and 21 to thereby connect the output terminal of delay line 126*b* to one input of buffer 104*b* via the lower contact and contact arm of relay 17 and the lower contact and contact arm of relay 21. Switch 25 is closed to energize relay 23 to thereby cause switching circuit 3*c* to invert the output of reading-recording head 8*c*. Switch 69 in the recorder and counter control 34 is closed to energize relay 67 to thereby permit counter 36 to be responsive to sprocket pulse signals. Switch 37 is closed to apply a positive voltage source via buffer 104*a* to one input of gate 82*a*. A positive voltage source is applied via resistor 49 to a second input of gate 82*a*. These two inputs function to condition gate 82*a* to pass positive pulse signals.

The magnetic tape 2 is then moved in a forward direction. The reading-recording head 8*c* senses the flux patterns recorded in the third sub-area of channel C and produces a series of playback signals EC3 (one of which is shown in Fig. 7) which are applied to switching circuit 3*c*. Switching circuit 3*c* is now in condition to invert the playback signals EC3 which are then applied to examiner 48.

Examiner 48 functions to transmit the inverted playback signals EC3 to recorder 24. More specifically, the inverted playback signals EC3 are amplified by the tape-reading amplifier 198*c* and applied to the amplitude discriminator 140*c*. If the amplitude of the amplified playback signal is of sufficient magnitude, it will be passed by the amplitude discriminator 140*c* to trigger the delay flop 336*c*.

The output of delay flop 336*c* is applied to recorder 24 which now functions to produce an eighth series of recording pulse signals hereafter called the sprocket pulse signals S (one of which is shown in Fig. 7).

More specifically, the output of examiner 48 is applied to delay line 126*b* to provide a fifteen microsecond delay for the inverted playback signals EC3. The inverted and delayed playback signals EC3 are applied via the lower contact and contact arm of relay 17, the lower contact and contact arm of relay 21 and buffer 104*b* to the third input of gate 82*a*. Inasmuch as the other two inputs of gate 82*a* are in a positive condition due to the positive output of buffer 104*a* and the positive voltage source being applied via resistor 49, the pulse signal train is passed by gate 82*a* and applied to D.-C. amplifier 248*a*.

The positive output of D.-C. amplifier 248*a* is applied to one input of gate 82*b*, while the negative output of D.-C. amplifier 248*a* is applied via four microsecond delay line 126*c* to a second input of gate 82*b*. The remaining inputs of gate 82*b* are in a positive condition due to the positive output of recorder and counter control 34 and the positive voltage source being applied via resistor 53, so that the positive output of D.-C. amplifier 248*a* will be passed by gate 82*b* and via buffer 104*c* to trigger the write delay flop 61.

The write delay flop 61 produces the sprocket recording pulse signals S which are applied to counter 36 and write amplifier 178*a*. Inasmuch as counter 36 is now responsive to the output of write delay flop 61, it will begin counting the sprocket pulse signals being produced by write delay flop 61. When the count reaches 512 the tenth stage of counter 36 (see Fig. 5) produces a positive step function which is applied to the input of gate 82*d* of the recorder and counter control 34, via the output terminal 546, to condition gate 82*d* to pass positive signals. When the count reaches 640, the eighth stage of counter 36 produces a positive step function which is applied to the other input of gate 82*d*, via the output terminal 544. This positive step function is passed via gate 82*d* to trigger the space delay flop 64.

The positive output of space delay flop 64 is differentiated by differentiator 71. The positive portion of the differentiated signal is amplified by the pulse amplifier 68 and applied via the lower contact and contact arm of relay 67 to the common reset terminal 514 of counter 36. Therefore, counter 36 will reset after 640 sprocket pulses have been counted. The negative output of space delay flop 64 is simultaneously applied to delay line 126*d* and will be delayed four microseconds by the delay line 126*d* before deconditioning gate 82*b* so as to give the positive output of D.-C. amplifier 248*a* sufficient time to trigger write delay flop 61 via gate 82*b* and buffer 104*c*. Negatively biased gate 82*b* will prevent any further signals from being recorded on the sprocket channel for a period of forty milliseconds which is the set period of the space delay flop 64. Thereafter, space delay flop 64 automatically resets and gate 82*b* is again permitted to pass positive pulse signals.

Write amplifier 178*a* is connected to one terminal of the reading-recording head 8*a* by means of the lower contact and lower contact arm of relay 40. The upper contact arm of relay 40 grounds the other terminal of reading-recording head 8*a* to complete the erasing and recording circuit for channel A.

Write amplifier 178*a* operates to erase the initial recording pulse siganl train A previously recorded in channel A and records the sprocket pulse signals in the sprocket channel corresponding to those pulse signals which were recorded in the third sub-areas of channel C and which when read have amplitudes equal to or greater than a given standard.

Thus, a sprocket pulse signal train is recorded in the sprocket channel in blocks, each block consisting of 640 pulse signals with a period of forty milliseconds between blocks.

*Step 10*

The tenth and final step in processing magnetic tape 2 is to erase the pulse signal train recorded in the second sub-areas of channel B and the pulse signal train recorded in the third sub-areas of channel C while retaining the sprocket pulse signal train in channel A.

Switches 42, 25, 27, 19 and 69 are opened to de-energize relays 40, 23, 21, 17 and 67. Switch 30 is closed to energize relay 28 and connect reading-recording head 8*b* in an erasing circuit via the contact arms of relay 28. Likewise, switch 20 is closed to energize relay 22 and connect reading-recording head 8*c* in an erasing circuit via the contact arms of relay 22. Switch 51 is closed to negatively bias gate 82*b* to thereby prevent the sprocket pulse signals recorded in channel A from being recorded in channels B and C.

Write amplifier 178*a* is now connected to one terminal of the reading-recording heads 8*b* and 8*c* via the lower contact and lower contact arm of relay 28 and the lower contact and lower contact arm of relay 22 respectively. The upper contact arm of relays 28 and 22 grounds the other terminal of reading-recording heads 8*b* and 8*c* respectively to complete the erasing circuits for channels B and C.

The magnetic tape 2 is then moved in a reverse direction and write amplifier 178*a* operates to erase the pulse signal trains B2 and C3 previously recorded in the second sub-areas of channel B and the third sub-areas of channel C respectively.

Thus, the sprocket pulse signal train is retained on the sprocket channel while all signals present in the remaining channels are erased. Magnetic tape 2 is then ready to be utilized as a magnetic storage device for an electronic digital computer which will store information items only in those positions on the magnetic tape 2 adjacent to the sprocket positions.

While only two representative embodiments of the invention disclosed herein have been outlined in detail, there will be obvious to those skilled in the art, many modifications and variations accomplishing the foregoing objects and realizing many or all of the advantages, but which do not depart essentially from the spirit of the invention.

What is claimed is:

1. A processor for a magnetic storage tape comprising means for examining discrete areas of said magnetic storage tape for acceptable magnetic properties, and means responsive to said examining means for recording a signal train in discrete areas of said magnetic storage tape, each signal of said signal train being recorded in a position corresponding to a portion of the discrete areas of said magnetic storage tape which have acceptable magnetic properties.

2. A processor for a storage medium having a plurality of channels comprising means for examining discrete areas in the channels of said storage medium for acceptable storage properties, and means responsive to said examining means for recording a signal train in discrete areas of said storage medium, each signal of said signal train being recorded in a position corresponding to a portion of the discrete areas of said channels which have acceptable storage properties.

3. A processor for a magnetic storage tape having a plurality of channels comprising means for examining discrete areas in the channels of said magnetic storage tape for acceptable magnetic properties, and means responsive to said examining means for recording a signal train in discrete areas of said magnetic storage tape, the signals of said signal train being recorded in positions corresponding to the discrete areas of said channels which have acceptable magnetic properties.

4. Apparatus for processing a storage medium having a plurality of longitudinal channels comprising means for sequentially examining each channel of said storage medium for acceptable data storage properties and a recorder responsive to said examining means for recording a good area indicating signal train in one of said examined channels designated as a good area indicating channel, each of the good area indicating signals being recorded in an area of said sprocket channel corresponding to areas in the remaining channels which have acceptable data storage properties.

5. Apparatus for processing a magnetic storage tape laterally divided into a plurality of longitudinal channels comprising means for sequentially examining each channel of said magnetic storage tape for acceptable magnetic properties, and a recorder responsive to said examining means for recording a good area indicating signal train in one of said examined channels designated as a good area indicating channel, each of the good area indicating signals being recorded in an area of said good area indicating channel adjacent to area in the remaining channels which have acceptable magnetic properties.

6. A processor for a storage medium having a plurality of channels comprising means for examining discrete areas in a first channel of said storage medium for acceptable storage properties, means for examining discrete areas in a second channel of said storage medium for acceptable storage properties, and means responsive to said examining means for recording a signal train in discrete areas of said storage medium, each signal of said signal train being recorded in positions corresponding to the discrete areas of said channels which have acceptable storage properties.

7. A processor for a magnetic storage tape having a plurality of channels comprising means for examining discrete areas in a first channel of said magnetic storage tape for acceptable magnetic properties, means for examining discrete areas in a second channel of said magnetic storage tape for acceptable magnetic properties, and means responsive to said examining means for recording a signal train in discrete areas of said magnetic storage tape, each signal of said signal train being recorded in positions adjacent to the discrete areas of said channels which have acceptable magnetic properties.

8. Apparatus for processing a storage medium having $n$ laterally spaced longitudinal channels comprising means for simultaneously recording a first signal train in $n-1$ channels, each signal of said first signal train being recorded in a discrete area of each of said $n-1$ channels, means for simultaneously examining said $n-1$ channels for acceptable data storage properties and recording a second signal train in the remaining channel, each signal of said second signal train being recorded in a discrete area of said remaining channel corresponding to the discrete area of each of said $n-1$ channels which have acceptable data storage properties, means for examining said remaining channel for acceptable data storage properties, and means responsive to said second examining means for simultaneously erasing said first signal train from one of said $n-1$ channels designated as a good area indicating channel and recording a good area indicating signal train in said good area indicating channel, each signal of said good area indicating signal train being recorded in a discrete area of said good area indicating channel which is included in a section of corresponding discrete areas which has acceptable data storage properties.

9. A processor for a storage device having two longitudinal channels comprising means for recording a first signal train in a first one of said channels, each signal of said first signal train being recorded in a discrete area of said first channel, means for examining the discrete areas of said first channel for acceptable data storage properties, recording means responsive to said examining means for recording a second signal train in the other one of said two channels, each signal of said second signal train corresponding to a discrete area of said first channel which has acceptable data storage properties being recorded in a corresponding discrete area of said other channel, means for examining said other channel for acceptable data storage properties, said recording means being responsive to said second mentioned examining means for simultaneously erasing the first signal train from said first channel and recording a good area indicating signal train in said first channel, each signal of said good area indicating signal train being recorded in a discrete area of said first channel corresponding to a discrete area of said other channel which has acceptable data storage properties.

10. Apparatus for processing a storage medium having a plurality of parallel channels comprising means for recording a first signal train in discrete areas of a first channel, means for examining said first channel for recorded signals having acceptable amplitudes, a recorder responsive to said examining means for recording a second signal train in discrete areas of second and third channels, the discrete areas of said second and third channels corresponding to the discrete areas of said first channel having signals of acceptable amplitudes recorded therein, means for examining said second and third channels for recorded signals having acceptable amplitudes, said recorder responsive to said second mentioned examining means for simultaneously erasing the first signal train from said first channel and recording a third signal train in the discrete areas of said first channel corresponding to the discrete areas of said second and third channels having signals of acceptable amplitude recorded therein.

11. A process for a magnetic storage medium having a plurality of channels, each of said channels having a plurality of discrete areas, comprising means for examining the discrete areas of a first one of said channels for acceptable magnetic properties, means for sequentially examining a plurality of sub-areas in each of the discrete areas of second and third channels for acceptable magnetic properties corresponding to the discrete areas of said first channel which have acceptable magnetic properties, and means for recording a signal train in the discrete areas of said first channel corresponding to the discrete areas of said second and third channels whose sub-areas have acceptable magnetic properties.

References Cited in the file of this patent

UNITED STATES PATENTS

| | | |
|---|---|---|
| 2,540,654 | Cohen et al. | Feb. 6, 1951 |
| 2,628,346 | Burkhart | Feb. 10, 1953 |